United States Patent
Lyon et al.

(10) Patent No.: US 12,546,590 B2
(45) Date of Patent: Feb. 10, 2026

(54) SYSTEMS AND METHODS FOR DETERMINING A LENGTH AND/OR A DIAMETER OF A CONDUIT

(71) Applicant: ResMed Sensor Technologies Limited, Dublin (IE)

(72) Inventors: Graeme Alexander Lyon, Dublin (IE); Roxana Tiron, Dublin (IE); Niall Andrew Fox, Dublin (IE); Redmond Shouldice, Dublin (IE); Stephen McMahon, Dublin (IE)

(73) Assignee: ResMed Sensor Technologies Limited, Dublin (IE)

( * ) Notice: Subject to any disclaimer, the term of this patent is extended or adjusted under 35 U.S.C. 154(b) by 314 days.

(21) Appl. No.: 18/248,804

(22) PCT Filed: Oct. 29, 2021

(86) PCT No.: PCT/IB2021/060053
§ 371 (c)(1),
(2) Date: Apr. 12, 2023

(87) PCT Pub. No.: WO2022/091034
PCT Pub. Date: May 5, 2022

(65) Prior Publication Data
US 2023/0417544 A1 Dec. 28, 2023

Related U.S. Application Data

(60) Provisional application No. 63/107,763, filed on Oct. 30, 2020.

(51) Int. Cl.
G01B 17/00 (2006.01)
A61B 5/00 (2006.01)
(Continued)

(52) U.S. Cl.
CPC ......... *G01B 17/00* (2013.01); *A61M 16/0003* (2014.02); *A61M 16/024* (2017.08);
(Continued)

(58) Field of Classification Search
CPC . G01B 17/00; A61M 16/0003; A61M 16/024; A61M 16/0622; A61M 16/08;
(Continued)

(56) References Cited

U.S. PATENT DOCUMENTS

| | | | |
|---|---|---|---|
| 5,245,995 | A | 9/1993 | Sullivan et al. |
| 6,502,572 | B1 | 1/2003 | Berthon-Jones et al. |

(Continued)

FOREIGN PATENT DOCUMENTS

| EP | 0092899 A2 * | 11/1983 |
|---|---|---|
| EP | 2 830 497 B1 | 11/2018 |

(Continued)

OTHER PUBLICATIONS

EP-0092899-A2, English Translation (Year: 1983).*
(Continued)

*Primary Examiner* — Ryan D Walsh
(74) *Attorney, Agent, or Firm* — Nixon Peabody LLP

(57) ABSTRACT

A method includes generating acoustic data representative of at least one or more reflections of an acoustic signal. The one or more reflections are indicative of a length and/or a diameter of a conduit coupled to a respiratory therapy device. The method further includes analyzing the acoustic data to determine the length and/or diameter of the conduit. In some cases, analyzing the acoustic data includes determining a resonant frequency of the conduit, and determining the length of the conduit based at least in part on the resonant frequency. In some cases, analyzing the acoustic data includes comparing the acoustic data to predetermined sets of acoustic data that each correspond to a known length (Continued)

and/or diameter of the conduit, and selecting one of the predetermined sets of acoustic data that best matches the generated acoustic data. The selected set of acoustic data corresponds to the length and/or diameter of the conduit.

20 Claims, 12 Drawing Sheets

(51) Int. Cl.
*A61M 16/00* (2006.01)
*A61M 16/06* (2006.01)
*A61M 16/08* (2006.01)

(52) U.S. Cl.
CPC ........ *A61M 16/0622* (2014.02); *A61M 16/08* (2013.01); *A61B 5/6803* (2013.01); *A61M 16/0605* (2014.02); *A61M 2205/3327* (2013.01); *A61M 2205/3331* (2013.01); *A61M 2205/3375* (2013.01); *A61M 2205/6018* (2013.01)

(58) Field of Classification Search
CPC ...... A61M 16/0605; A61M 2205/3327; A61M 2205/3331; A61M 2205/3375; A61M 2205/6018; A61B 5/6803
See application file for complete search history.

(56) References Cited

U.S. PATENT DOCUMENTS

| | | | |
|---|---|---|---|
| 9,358,353 | B2 | 6/2016 | Armitstead et al. |
| 10,376,224 | B2 | 8/2019 | Aarts et al. |
| 10,492,720 | B2 | 12/2019 | Phillips et al. |
| 10,660,563 | B2 | 5/2020 | McDarby et al. |
| 2011/0313689 | A1 | 12/2011 | Holley et al. |
| 2017/0311879 | A1 | 11/2017 | Armitstead et al. |
| 2020/0337634 | A1 | 10/2020 | McDarby et al. |
| 2020/0383580 | A1 | 12/2020 | Shouldice et al. |
| 2021/0150873 | A1 | 5/2021 | Shouldice et al. |
| 2022/0168526 | A1* | 6/2022 | Holley .............. A61M 16/0875 |
| 2022/0339383 | A1* | 10/2022 | Holley ................. A61B 5/7257 |
| 2023/0191063 | A1* | 6/2023 | Fox ................... A61M 16/0069 128/206.24 |
| 2023/0377114 | A1* | 11/2023 | Shouldice ......... A61M 16/0003 |
| 2024/0024597 | A1* | 1/2024 | Dos Santos ....... A61M 16/0666 |
| 2024/0131287 | A1* | 4/2024 | Peake ................... G16H 40/63 |

FOREIGN PATENT DOCUMENTS

| | | | | |
|---|---|---|---|---|
| EP | 3476678 A1 * | 5/2019 | ............ B60T 13/665 |
| WO | 2008/138040 A1 | 11/2008 | |
| WO | 2014/047310 A1 | 3/2014 | |
| WO | 2016/061629 A1 | 4/2016 | |
| WO | 2017/132726 A1 | 8/2017 | |
| WO | 2018/050913 A1 | 3/2018 | |
| WO | 2019/122413 A1 | 6/2019 | |
| WO | 2019/122414 A1 | 6/2019 | |
| WO | 2020/104465 A2 | 5/2020 | |
| WO | 2021250553 A1 | 12/2021 | |

OTHER PUBLICATIONS

EP-3476678-A1, English Translation (Year: 2019).*
International Search Report in International Patent Application No. PCT/IB2021/060053 mailed Jan. 21, 2022 (4 pp.).
Written Opinion in International Patent Application No. PCT/IB2021/060053 mailed Jan. 21, 2022 (4 pp.).

* cited by examiner

SYSTEMS AND METHODS FOR DETERMINING A LENGTH AND/OR A DIAMETER OF A CONDUIT

CROSS-REFERENCE TO RELATED APPLICATIONS

This application is a U.S. National Stage of International Application No. PCT/IB2021/060053, filed on Oct. 29, 2021, which claims the benefit of, and priority to, U.S. Provisional Patent Application No. 63/107,763 filed on Oct. 30, 2020, each of which is hereby incorporated by reference herein in its entirety.

TECHNICAL FIELD

The present disclosure relates generally to systems and methods for determining the length and/or diameter of a conduit, and more particularly, to systems and methods for determining the length and/or diameter of a conduit used as part of a respiratory therapy system.

BACKGROUND

Many individuals suffer from sleep-related and/or respiratory disorders such as, for example, Sleep-Disordered Breathing (SDB), which can include Obstructive Sleep Apnea (OSA), Central Sleep Apnea (CSA), other types of apneas such as mixed apneas and hypopneas, and Respiratory Effort Related Arousal (RERA). These individuals may also suffer from other health conditions (which may be referred to as comorbidities), such as insomnia (characterized by, for example, difficult in initiating sleep, frequent or prolonged awakenings after initially falling asleep, and/or an early awakening with an inability to return to sleep), Periodic Limb Movement Disorder (PLMD), Restless Leg Syndrome (RLS), Cheyne-Stokes Respiration (CSR), respiratory insufficiency, Obesity Hyperventilation Syndrome (OHS), Chronic Obstructive Pulmonary Disease (COPD), Neuromuscular Disease (NMD), rapid eye movement (REM) behavior disorder (also referred to as RBD), dream enactment behavior (DEB), hypertension, diabetes, stroke, and chest wall disorders. These individuals are often treated using a respiratory therapy system (e.g., a continuous positive airway pressure (CPAP) system), which delivers pressurized air to aid in preventing the individual's airway from narrowing or collapsing during sleep. The respiratory therapy system can generate physiological data associated with a sleep session, which in turn can be used to determine sleep-related parameters and/or generate reports indicative of sleep quality. The respiratory therapy system can use a conduit to aid in delivery the pressurized air to the individual's airway. However, the length of the conduit can impact the operation of the respiratory therapy system, and subsequently the effectiveness of the treatment. Thus, it would be beneficial to be able to determine the length of the conduit when it is being used to deliver the pressurized air to the individual's airway. The present disclosure is directed to solving this and other problems.

SUMMARY

According to some implementations of the present disclosure, a method comprises generating acoustic data representative of at least one or more reflections of an acoustic signal in a conduit coupled to a respiratory therapy device. The one or more reflections are indicative of a length of the conduit, a diameter of the conduit, or both the length of the conduit and the diameter of the conduit. The method further includes analyzing the acoustic data to determine the length of the conduit, the diameter of the conduit, or both the length of the conduit and the diameter of the conduit.

According to some implementations of the present disclosure, analyzing the acoustic data includes determining a resonant frequency of the conduit based at least in part on the acoustic data, and determining the length of the conduit based at least in part on the resonant frequency of the conduit.

According to some implementations of the present disclosure, the method further includes producing a frequency-domain intensity signal from the acoustic data. The frequency-domain intensity signal represents an intensity of the one or more reflections of the acoustic signal across a frequency band. The method further includes selecting a portion of the frequency-domain intensity signal expected to include the resonant frequency of the conduit. The method further includes calculating a Fourier Transform of the selected portion of the frequency-domain intensity signal. The method further includes extracting the resonant frequency of the conduit from the Fourier Transform of the selected portion of the frequency-domain intensity signal.

According to some implementations of the present disclosure, the method further includes calculating a log of the frequency-domain intensity signal prior to selecting the portion of the frequency-domain intensity signal expected to include the resonant frequency of the conduit. According to some implementations of the present disclosure, selecting the portion of the frequency-domain intensity signal expected to include the resonant frequency of the conduit is based at least in part on a speed of sound, a sampling rate of the acoustic data, predetermined conduit length ranges, or a combination thereof.

According to some implementations of the present disclosure, analyzing the acoustic data includes comparing at least a portion of the acoustic data to one or more predetermined sets of acoustic data. Each of the one or more predetermined sets of acoustic data corresponds to (i) a conduit having a known length, (ii) a conduit having a known diameter, or (iii) both (i) and (ii). The method further includes selecting one of the one or more predetermined sets of acoustic data that matches the portion of the acoustic data. The selected predetermined set of acoustic data corresponds to the length of the conduit, the diameter of the conduit, or both the length of the conduit and the diameter of the conduit, According to some implementations of the present disclosure, the method further includes generating an initial characterization and/or categorization of a user interface coupled to the conduit based at least in part on the acoustic data. The method further includes generating an updated characterization and/or categorization of the user interface based at least in part on (i) the initial characterization of the user interface, and (ii) the length of the conduit, the diameter of the conduit, or both the length of the conduit and the diameter of the conduit.

According to some implementations of the present disclosure, the method further includes calculating a cepstrum of the generated acoustic data and adjusting the cepstrum based at least in part on the length of the conduit, the diameter of the conduit, or both the length of the conduit and the diameter of the conduit. According to some implementations of the present disclosure, the initial characterization of the user interface is based at least in part on an assumed length and/or diameter of the conduit, and adjusting the cepstrum includes multiplying the cepstrum by a ratio of (i) the determined length of the conduit to (ii) the assumed length of the conduit, by a ratio of (i) the determined diameter of the conduit to (ii) the assumed diameter of the conduit, or both.

According to some implementations of the present disclosure, the method further includes supplying pressurized air to an airway of a user via the conduit and a user interface coupled to the conduit. The method further includes comparing the length and/or diameter of the conduit to an expected length and/or diameter of the conduit. The method further includes causing an action to be performed, in response to the length and/or diameter of the conduit being different than the expected length and/or diameter of the conduit.

According to some implementations of the present disclosure, the method further includes supplying pressurized air to an airway of a user via the conduit and a user interface coupled to the conduit. The method further includes determining the length and/or diameter of the conduit at a first time prior to the supplying of the pressurized air to the airway of the user. The method further includes determining the length and/or diameter of the conduit at a second time during the supplying of the pressurized air to the airway of the user. The method further includes in response to the length and/or diameter of the conduit at the second time being different than the length and/or diameter of the conduit at the second time by at least a threshold amount, causing an action to be performed.

According to some implementations of the present disclosure, a system comprises a respiratory therapy system, a memory device, and a control system. The respiratory therapy system includes a respiratory therapy device configured to supply pressurized air, and a user interface coupled to the respiratory therapy device via a conduit. The user interface is configured to engage the user and aid in directing the supplied pressurized air to an airway of the user. The memory device stores machine-readable instructions. The control system is coupled to the memory device, and includes one or more processors configured to execute the machine-readable instructions to generate acoustic data representative of at least one or more reflections of an acoustic signal in the conduit. The one or more reflections are indicative of a length of the conduit, a diameter of the conduit, or both the length of the conduit and the diameter of the conduit. The one or more processors are further configured to execute the machine-readable instructions to analyze the acoustic data to determine the length of the conduit, the diameter of the conduit, or both the length of the conduit and the diameter of the conduit.

According to some implementations of the present disclosure, a method comprises generating acoustic data representative of at least one or more reflections of an acoustic signal. The one or more reflections are indicative of one or more characteristics of a conduit coupled to a respiratory therapy device. The method further includes analyzing the acoustic data. Analyzing the acoustic data includes comparing at least a portion of the acoustic data to one or more predetermined sets of acoustic data. Each of the one or more predetermined sets of acoustic data corresponds to a known value of at least one of the one or more characteristics. The method further includes determining, based at least in part on the analysis, a value of the one or more characteristics of the conduit.

According to some implementations of the present disclosure, a system comprises a respiratory therapy system, a memory device, and a control system. The respiratory therapy system includes a respiratory therapy device configured to supply pressurized air, and a user interface coupled to the respiratory therapy device via a conduit. The user interface is configured to engage the user and aid in directing the supplied pressurized air to an airway of the user. The memory device stores machine-readable instructions. The control system is coupled to the memory device, and includes one or more processors configured to execute the machine-readable instructions to generate acoustic data representative of at least one or more reflections of an acoustic signal. The one or more reflections are indicative of one or more characteristics of the conduit. The one or more processors are further configured to execute the machine-readable instructions to analyze the acoustic data. The analyzing includes comparing at least a portion of the acoustic data to one or more predetermined sets of acoustic data. Each of the one or more predetermined sets of acoustic data corresponds to a known value of at least one of the one or more characteristics. The one or more processors are further configured to execute the machine-readable instructions to determine, based at least in part on the analysis, a value of the one or more characteristics of the conduit.

The above summary is not intended to represent each embodiment or every aspect of the present invention. Additional features and benefits of the present invention are apparent from the detailed description and figures set forth below.

Figure 1:
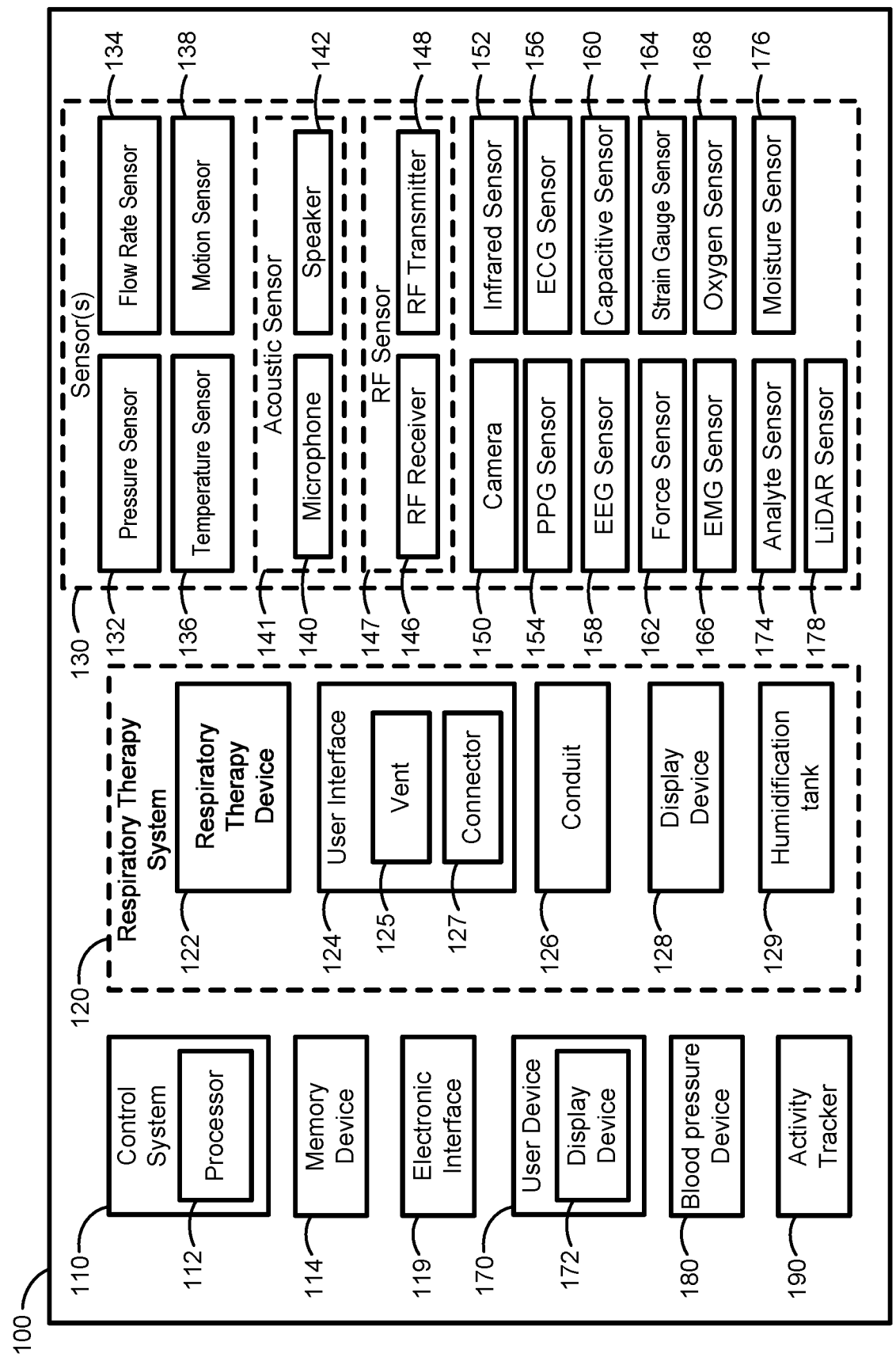
FIG. 1 is a functional block diagram of a system for canceling noise associated with operation of a respiratory therapy system that includes a respiratory therapy device, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

The present disclosure is described with reference to the attached figures, where like reference numerals are used throughout the figures to designate similar or equivalent elements. The figures are not drawn to scale, and are provided merely to illustrate the instant disclosure. Several aspects of the disclosure are described below with reference to example applications for illustration.

Many individuals suffer from sleep-related and/or respiratory disorders, such as Periodic Limb Movement Disorder (PLMD), Restless Leg Syndrome (RLS), Sleep-Disordered Breathing (SDB) such as Obstructive Sleep Apnea (OSA), Central Sleep Apnea (CSA) and other types of apneas, Respiratory Effort Related Arousal (RERA), Cheyne-Stokes Respiration (CSR), respiratory insufficiency, Obesity Hyperventilation Syndrome (OHS), Chronic Obstructive Pulmonary Disease (COPD), Neuromuscular Disease (NMD), and chest wall disorders. Obstructive Sleep Apnea (OSA), a form of Sleep Disordered Breathing (SDB), is characterized by events including occlusion or obstruction of the upper air passage during sleep resulting from a combination of an abnormally small upper airway and the normal loss of muscle tone in the region of the tongue, soft palate and posterior oropharyngeal wall. Central Sleep Apnea (CSA) is another form of sleep disordered breathing. CSA results when the brain temporarily stops sending signals to the muscles that control breathing. Other types of apneas include hypopnea, hyperpnea, and hypercapnia. Hypopnea is generally characterized by slow or shallow breathing caused by a narrowed airway, as opposed to a blocked airway. Hyperpnea is generally characterized by an increase depth and/or rate of breathing. Hypercapnia is generally characterized by elevated or excessive carbon dioxide in the bloodstream, typically caused by inadequate respiration. A Respiratory Effort Related Arousal (RERA) event is typically characterized by an increased respiratory effort for ten seconds or longer leading to arousal from sleep and which does not fulfill the criteria for an apnea or hypopnea event. RERAs are defined as a sequence of breaths characterized by increasing respiratory effort leading to an arousal from sleep, but which does not meet criteria for an apnea or hypopnea. These events must fulfil both of the following criteria: (1) a pattern of progressively more negative esophageal pressure, terminated by a sudden change in pressure to a less negative level and an arousal, and (2) the event lasts ten seconds or longer. In some implementations, a Nasal Cannula/Pressure Transducer System is adequate and reliable in the detection of RERAs. A RERA detector may be based on a real flow signal derived from a respiratory therapy device. For example, a flow limitation measure may be determined based on a flow signal. A measure of arousal may then be derived as a function of the flow limitation measure and a measure of sudden increase in ventilation. One such method is described in WO 2008/138040 and U.S. Pat. No. 9,358,353, assigned to ResMed Ltd., the disclosure of each of which is hereby incorporated by reference herein in their entireties.

Cheyne-Stokes Respiration (CSR) is a further form of SDB. CSR is a disorder of a patient's respiratory controller in which there are rhythmic alternating periods of waxing and waning ventilation known as CSR cycles. CSR is characterized by repetitive de-oxygenation and re-oxygenation of the arterial blood. OHS is defined as the combination of severe obesity and awake chronic hypercapnia, in the absence of other known causes for hypoventilation. Symptoms include dyspnea, morning headache and excessive daytime sleepiness. COPD encompasses any of a group of lower airway diseases that have certain characteristics in common, such as increased resistance to air movement, extended expiratory phase of respiration, and loss of the normal elasticity of the lung. NMD encompasses many diseases and ailments that impair the functioning of the muscles either directly via intrinsic muscle pathology, or indirectly via nerve pathology. Chest wall disorders are a group of thoracic deformities that result in inefficient coupling between the respiratory muscles and the thoracic cage.

Many of these disorders are characterized by particular events (e.g., snoring, an apnea, a hypopnea, a restless leg, a sleeping disorder, choking, an increased heart rate, labored breathing, an asthma attack, an epileptic episode, a seizure, or any combination thereof) that can occur when the individual is sleeping. A wide variety of types of data can be used to monitor the health of individuals having any of the above types of sleep-related and/or respiratory disorders (or other disorders). However, it is often difficult to collect accurate data in a manner that does not interrupt or disturb the user's sleep, or interfere with any treatment the user may be undergoing during sleep. Thus, it is advantageous to utilize a system for treatment that includes various sensors to generate and collect data, without disturbing the user, the user's sleep, or the user's treatment.

The Apnea-Hypopnea Index (AHI) is an index used to indicate the severity of sleep apnea during a sleep session. The AHI is calculated by dividing the number of apnea and/or hypopnea events experienced by the user during the sleep session by the total number of hours of sleep in the sleep session. The event can be, for example, a pause in breathing that lasts for at least 10 seconds. An AHI that is less than 5 is considered normal. An AHI that is greater than or equal to 5, but less than 15 is considered indicative of mild sleep apnea. An AHI that is greater than or equal to 15, but less than 30 is considered indicative of moderate sleep apnea. An AHI that is greater than or equal to 30 is considered indicative of severe sleep apnea. In children, an AHI that is greater than 1 is considered abnormal. Sleep apnea can be considered "controlled" when the AHI is normal, or when the AHI is normal or mild. The AHI can also be used in combination with oxygen desaturation levels to indicate the severity of Obstructive Sleep Apnea.

Referring to FIG. 1, a system 100, according to some implementations of the present disclosure, is illustrated. The system 100 includes a control system 110, a memory device 114, an electronic interface 119, one or more sensors 130, and optionally one or more user devices 170. In some implementations, the system 100 further includes a respiratory therapy system 120 (that includes a respiratory therapy device 122), a blood pressure device 180, an activity tracker 190, or any combination thereof. The system 100 can be used to determine the length of a conduit used during operation of the respiratory therapy system 120.

The control system 110 includes one or more processors 112 (hereinafter, processor 112). The control system 110 is generally used to control (e.g., actuate) the various components of the system 100 and/or analyze data obtained and/or generated by the components of the system 100. The processor 112 can be a general or special purpose processor or microprocessor. While one processor 112 is shown in FIG. 1, the control system 110 can include any suitable number of processors (e.g., one processor, two processors, five processors, ten processors, etc.) that can be in a single housing, or located remotely from each other. The control system 110 (or any other control system) or a portion of the control system 110 such as the processor 112 (or any other processor(s) or portion(s) of any other control system), can be used to carry out one or more steps of any of the methods described and/or claimed herein. The control system 110 can be coupled to and/or positioned within, for example, a housing of the user device 170, and/or within a housing of one or more of the sensors 130. The control system 110 can be centralized (within one such housing) or decentralized (within two or more of such housings, which are physically distinct). In such implementations including two or more housings containing the control system 110, such housings can be located proximately and/or remotely from each other.

The memory device 114 stores machine-readable instructions that are executable by the processor 112 of the control system 110. The memory device 114 can be any suitable computer readable storage device or media, such as, for example, a random or serial access memory device, a hard drive, a solid state drive, a flash memory device, etc. While one memory device 114 is shown in FIG. 1, the system 100 can include any suitable number of memory devices 114 (e.g., one memory device, two memory devices, five memory devices, ten memory devices, etc.). The memory device 114 can be coupled to and/or positioned within a housing of the respiratory therapy device 122 of the respiratory therapy system 120, within a housing of the user device 170, within a housing of one or more of the sensors 130, or any combination thereof. Like the control system 110, the memory device 114 can be centralized (within one such housing) or decentralized (within two or more of such housings, which are physically distinct).

In some implementations, the memory device 114 stores a user profile associated with the user. The user profile can include, for example, demographic information associated with the user, biometric information associated with the user, medical information associated with the user, self-reported user feedback, sleep parameters associated with the user (e.g., sleep-related parameters recorded from one or more earlier sleep sessions), or any combination thereof. The demographic information can include, for example, information indicative of an age of the user, a gender of the user, a race of the user, a family medical history (such as a family history of insomnia or sleep apnea), an employment status of the user, an educational status of the user, a socioeconomic status of the user, or any combination thereof. The medical information can include, for example, information indicative of one or more medical conditions associated with the user, medication usage by the user, or both. The medical information data can further include a fall risk assessment associated with the user (e.g., a fall risk score using the Morse fall scale), a multiple sleep latency test (MSLT) result or score and/or a Pittsburgh Sleep Quality Index (PSQI) score or value. The self-reported user feedback can include information indicative of a self-reported subjective sleep score (e.g., poor, average, excellent), a self-reported subjective stress level of the user, a self-reported subjective fatigue level of the user, a self-reported subjective health status of the user, a recent life event experienced by the user, or any combination thereof.

The electronic interface 119 is configured to receive data (e.g., physiological data and/or acoustic data) from the one or more sensors 130 such that the data can be stored in the memory device 114 and/or analyzed by the processor 112 of the control system 110. The electronic interface 119 can communicate with the one or more sensors 130 using a wired connection or a wireless connection (e.g., using an RF communication protocol, a WiFi communication protocol, a Bluetooth communication protocol, an IR communication protocol, over a cellular network, over any other optical communication protocol, etc.). The electronic interface 119 can include an antenna, a receiver (e.g., an RF receiver), a transmitter (e.g., an RF transmitter), a transceiver, or any combination thereof. The electronic interface 119 can also include one more processors and/or one more memory devices that are the same as, or similar to, the processor 112 and the memory device 114 described herein. In some implementations, the electronic interface 119 is coupled to or integrated in the user device 170. In other implementations, the electronic interface 119 is coupled to or integrated (e.g., in a housing) with the control system 110 and/or the memory device 114.

As noted above, in some implementations, the system 100 optionally includes a respiratory therapy system 120 (also referred to as a respiratory pressure therapy system). The respiratory therapy system 120 can include a respiratory therapy device 122 (also referred to as a respiratory pressure device), a user interface 124 (also referred to as a mask or a patient interface), a conduit 126 (also referred to as a tube or an air circuit), a display device 128, a humidification tank 129, or any combination thereof. In some implementations, the control system 110, the memory device 114, the display device 128, one or more of the sensors 130, and the humidification tank 129 are part of the respiratory therapy device 122. Respiratory pressure therapy refers to the application of a supply of air to an entrance to a user's airways at a controlled target pressure that is nominally positive with respect to atmosphere throughout the user's breathing cycle (e.g., in contrast to negative pressure therapies such as the tank ventilator or cuirass). The respiratory therapy system 120 is generally used to treat individuals suffering from one or more sleep-related respiratory disorders (e.g., obstructive sleep apnea, central sleep apnea, or mixed sleep apnea), other respiratory disorders such as COPD, or other disorders leading to respiratory insufficiency, that may manifest either during sleep or wakefulness.

The respiratory therapy device 122 is generally used to generate pressurized air that is delivered to a user (e.g., using one or more motors (such as a blower motor) that drive one or more compressors). In some implementations, the respiratory therapy device 122 generates continuous constant air pressure that is delivered to the user. In other implementations, the respiratory therapy device 122 generates two or more predetermined pressures (e.g., a first predetermined air pressure and a second predetermined air pressure). In still other implementations, the respiratory therapy device 122 is configured to generate a variety of different air pressures within a predetermined range. For example, the respiratory therapy device 122 can deliver at least about 6 cm $H_2O$, at least about 10 cm $H_2O$, at least about 20 cm $H_2O$, between about 6 cm $H_2O$ and about 10 cm $H_2O$, between about 7 cm $H_2O$ and about 12 cm $H_2O$, etc. The respiratory therapy device 122 can also deliver pressurized air at a predetermined flow rate between, for example, about −20 L/min and about 150 L/min, while maintaining a positive pressure (relative to the ambient pressure). In some implementations, the control system 110, the memory device 114, the electronic interface 119, or any combination thereof can be coupled to and/or positioned within a housing of the respiratory therapy device 122.

The user interface 124 engages a portion of the user's face and delivers pressurized air from the respiratory therapy device 122 to the user's airway to aid in preventing the airway from narrowing and/or collapsing during sleep. This may also increase the user's oxygen intake during sleep. Depending upon the therapy to be applied, the user interface 124 may form a seal, for example, with a region or portion of the user's face, to facilitate the delivery of gas at a pressure at sufficient variance with ambient pressure to effect therapy, for example, at a positive pressure of about 10 cm $H_2O$ relative to ambient pressure. For other forms of therapy, such as the delivery of oxygen, the user interface may not include a seal sufficient to facilitate delivery to the airways of a supply of gas at a positive pressure of about 10 cm$H_2O$.

Figure 2:
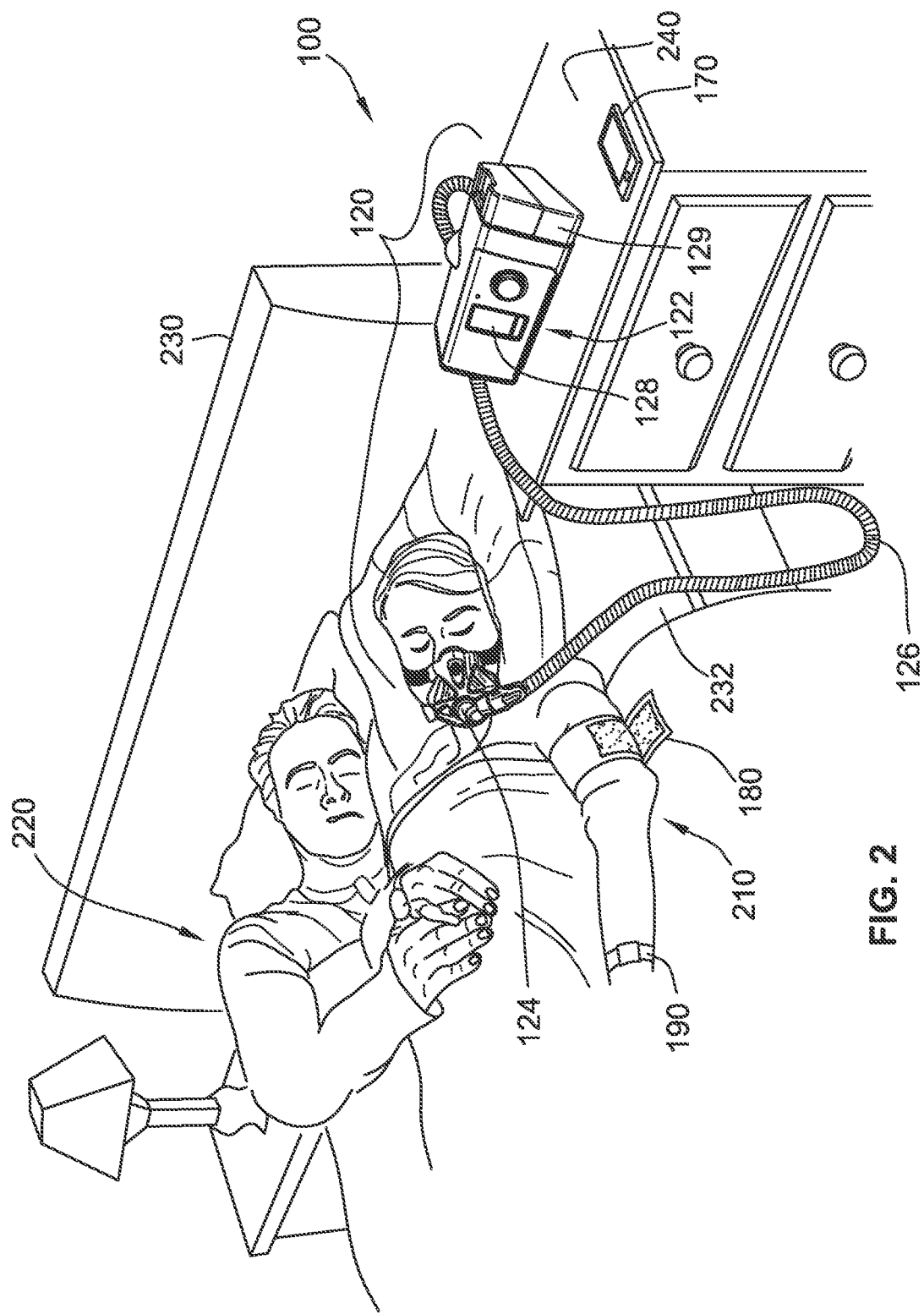
FIG. 2 is a perspective view of the system of FIG. 1, a user of the system, and a bed partner of the user, according to some implementations of the present disclosure.

In some implementations, the user interface 124 is or includes a facial mask that covers the nose and mouth of the user (as shown, for example, in FIG. 2). Alternatively, the user interface 124 is or includes a nasal mask that provides air to the nose of the user or a nasal pillow mask that delivers air directly to the nostrils of the user. The user interface 124 can include a strap assembly that has a plurality of straps (e.g., including hook and loop fasteners) for positioning and/or stabilizing the user interface 124 on a portion of the user interface 124 on a desired location of the user (e.g., the face), and a conformal cushion (e.g., silicone, plastic, foam, etc.) that aids in providing an air-tight seal between the user interface 124 and the user. In some implementations, the user interface 124 may include a connector 127 and one or more vents 125. The one or more vents 125 can be used to permit the escape of carbon dioxide and other gases exhaled by the user. In other implementations, the user interface 124 includes a mouthpiece (e.g., a night guard mouthpiece molded to conform to the user's teeth, a mandibular repositioning device, etc.). In some implementations, the connector 127 is distinct from, but couplable to, the user interface 124 (and/or conduit 126). The connector 127 is configured to connect and fluidly couple the user interface 124 to the conduit 126.

The conduit 126 allows the flow of air between two components of a respiratory therapy system 120, such as the respiratory therapy device 122 and the user interface 124. In some implementations, there can be separate limbs of the conduit for inhalation and exhalation. In other implementations, a single limb conduit is used for both inhalation and exhalation. Generally, the respiratory therapy system 120 forms an air pathway that extends between a motor of the respiratory therapy device 122 and the user and/or the user's airway. Thus, the air pathway generally includes at least a motor of the respiratory therapy device 122, the user interface 124, and the conduit 126.

One or more of the respiratory therapy device 122, the user interface 124, the conduit 126, the display device 128, and the humidification tank 129 can contain one or more sensors (e.g., a pressure sensor, a flow rate sensor, or more generally any of the other sensors 130 described herein). These one or more sensors can be used, for example, to measure the air pressure and/or flow rate of pressurized air supplied by the respiratory therapy device 122.

The display device 128 is generally used to display image(s) including still images, video images, or both and/or information regarding the respiratory therapy device 122. For example, the display device 128 can provide information regarding the status of the respiratory therapy device 122 (e.g., whether the respiratory therapy device 122 is on/off, the pressure of the air being delivered by the respiratory therapy device 122, the temperature of the air being delivered by the respiratory therapy device 122, etc.) and/or other information (e.g., a sleep score or a therapy score (such as a myAir® score, such as described in WO 2016/061629 and US 2017/0311879, each of which is hereby incorporated by reference herein in its entirety), the current date/time, personal information for the user, a questionnaire for the user, etc.). In some implementations, the display device 128 acts as a human-machine interface (HMI) that includes a graphic user interface (GUI) configured to display the image(s) as an input interface. The display device 128 can be an LED display, an OLED display, an LCD display, or the like. The input interface can be, for example, a touchscreen or touch-sensitive substrate, a mouse, a keyboard, or any sensor system configured to sense inputs made by a human user interacting with the respiratory therapy device 122.

The humidification tank 129 is coupled to or integrated in the respiratory therapy device 122 and includes a reservoir of water that can be used to humidify the pressurized air delivered from the respiratory therapy device 122. The respiratory therapy device 122 can include a heater to heat the water in the humidification tank 129 in order to humidify the pressurized air provided to the user. Additionally, in some implementations, the conduit 126 can also include a heating element (e.g., coupled to and/or imbedded in the conduit 126) that heats the pressurized air delivered to the user. The humidification tank 129 can be fluidly coupled to a water vapor inlet of the air pathway and deliver water vapor into the air pathway via the water vapor inlet, or can be formed in-line with the air pathway as part of the air pathway itself. In other implementations, the respiratory therapy device 122 or the conduit 126 can include a waterless humidifier. The waterless humidifier can incorporate sensors that interface with other sensor positioned elsewhere in system 100.

The respiratory therapy system 120 can be used, for example, as a ventilator or a positive airway pressure (PAP) system, such as a continuous positive airway pressure (CPAP) system, an automatic positive airway pressure system (APAP), a bi-level or variable positive airway pressure system (BPAP or VPAP), or any combination thereof. The CPAP system delivers a predetermined air pressure (e.g., determined by a sleep physician) to the user. The APAP system automatically varies the air pressure delivered to the user based at least in part on, for example, respiration data associated with the user. The BPAP or VPAP system is configured to deliver a first predetermined pressure (e.g., an inspiratory positive airway pressure or IPAP) and a second predetermined pressure (e.g., an expiratory positive airway pressure or EPAP) that is lower than the first predetermined pressure.

Referring to FIG. 2, a portion of the system 100 (FIG. 1), according to some implementations, is illustrated. A user 210 of the respiratory therapy system 120 and a bed partner 220 are located in a bed 230 and are laying on a mattress 232. The user interface 124 (e.g., a full facial mask) can be worn by the user 210 during a sleep session. The user interface 124 is fluidly coupled and/or connected to the respiratory therapy device 122 via the conduit 126. In turn, the respiratory therapy device 122 delivers pressurized air to the user 210 via the conduit 126 and the user interface 124 to increase the air pressure in the throat of the user 210 to aid in preventing the airway from closing and/or narrowing during sleep. The respiratory therapy device 122 can include the display device 128, which can allow the user to interact with the respiratory therapy device 122. The respiratory therapy device 122 can also include the humidification tank 129, which stores the water used to humidify the pressurized air. The respiratory therapy device 122 can be positioned on a nightstand 240 that is directly adjacent to the bed 230 as shown in FIG. 2, or more generally, on any surface or structure that is generally adjacent to the bed 230 and/or the user 210. The user can also wear the blood pressure device 180 and the activity tracker 190 while lying on the mattress 232 in the bed 230.

Referring back to FIG. 1, the one or more sensors 130 of the system 100 include a pressure sensor 132, a flow rate sensor 134, temperature sensor 136, a motion sensor 138, a microphone 140, a speaker 142, a radio-frequency (RF) receiver 146, an RF transmitter 148, a camera 150, an infrared (IR) sensor 152, a photoplethysmogram (PPG) sensor 154, an electrocardiogram (ECG) sensor 156, an electroencephalography (EEG) sensor 158, a capacitive sensor 160, a force sensor 162, a strain gauge sensor 164, an electromyography (EMG) sensor 166, an oxygen sensor 168, an analyte sensor 174, a moisture sensor 176, a light detection and ranging (LiDAR) sensor 178, or any combination thereof. Generally, each of the one or sensors 130 are configured to output sensor data that is received and stored in the memory device 114 or one or more other memory devices. The sensors 130 can also include, an electrooculography (EOG) sensor, a peripheral oxygen saturation ($SpO_2$) sensor, a galvanic skin response (GSR) sensor, a carbon dioxide ($CO_2$) sensor, or any combination thereof.

While the one or more sensors 130 are shown and described as including each of the pressure sensor 132, the flow rate sensor 134, the temperature sensor 136, the motion sensor 138, the microphone 140, the speaker 142, the RF receiver 146, the RF transmitter 148, the camera 150, the IR sensor 152, the PPG sensor 154, the ECG sensor 156, the EEG sensor 158, the capacitive sensor 160, the force sensor 162, the strain gauge sensor 164, the EMG sensor 166, the oxygen sensor 168, the analyte sensor 174, the moisture sensor 176, and the LiDAR sensor 178, more generally, the one or more sensors 130 can include any combination and any number of each of the sensors described and/or shown herein.

The one or more sensors 130 can be used to generate, for example physiological data, acoustic data, or both, that is associated with a user of the respiratory therapy system 120 (such as the user 210 of FIG. 2), the respiratory therapy system 120, both the user and the respiratory therapy system 120, or other entities, objects, activities, etc. Physiological data generated by one or more of the sensors 130 can be used by the control system 110 to determine a sleep-wake signal associated with the user during the sleep session and one or more sleep-related parameters. The sleep-wake signal can be indicative of one or more sleep stages (sometimes referred to as sleep states), including sleep, wakefulness, relaxed wakefulness, micro-awakenings, or distinct sleep stages such as a rapid eye movement (REM) stage (which can include both a typical REM stage and an atypical REM stage), a first non-REM stage (often referred to as "N1"), a second non-REM stage (often referred to as "N2"), a third non-REM stage (often referred to as "N3"), or any combination thereof. Methods for determining sleep stages from physiological data generated by one or more of the sensors, such as sensors 130, are described in, for example, WO 2014/047310, U.S. Pat. Nos. 10,492,720, 10,660,563, US 2020/0337634, WO 2017/132726, WO 2019/122413, US 2021/0150873, WO 2019/122414, US 2020/0383580, each of which is hereby incorporated by reference herein in its entirety.

The sleep-wake signal can also be timestamped to indicate a time that the user enters the bed, a time that the user exits the bed, a time that the user attempts to fall asleep, etc. The sleep-wake signal can be measured one or more of the sensors 130 during the sleep session at a predetermined sampling rate, such as, for example, one sample per second, one sample per seconds, one sample per minute, etc. Examples of the one or more sleep-related parameters that can be determined for the user during the sleep session based at least in part on the sleep-wake signal include a total time in bed, a total sleep time, a total wake time, a sleep onset latency, a wake-after-sleep-onset parameter, a sleep efficiency, a fragmentation index, an amount of time to fall asleep, a consistency of breathing rate, a fall asleep time, a wake time, a rate of sleep disturbances, a number of movements, or any combination thereof.

Physiological data and/or acoustic data generated by the one or more sensors 130 can also be used to determine a respiration signal associated with the user during a sleep session. The respiration signal is generally indicative of respiration or breathing of the user during the sleep session. The respiration signal can be indicative of, for example, a respiration rate, a respiration rate variability, an inspiration amplitude, an expiration amplitude, an inspiration-expiration amplitude ratio, an inspiration-expiration duration ratio, a number of events per hour, a pattern of events, pressure settings of the respiratory therapy device 122, or any combination thereof. The event(s) can include snoring, apneas, central apneas, obstructive apneas, mixed apneas, hypopneas, RERAs, a flow limitation (e.g., an event that results in the absence of the increase in flow despite an elevation in negative intrathoracic pressure indicating increased effort), a mask leak (e.g., from the user interface 124), a restless leg, a sleeping disorder, choking, an increased heart rate, a heart rate variation, labored breathing, an asthma attack, an epileptic episode, a seizure, a fever, a cough, a sneeze, a snore, a gasp, the presence of an illness such as the common cold or the flu, an elevated stress level, etc. Events can be detected by any means known in the art such as described in, for example, U.S. Pat. Nos. 5,245,995, 6,502,572, WO 2018/050913, WO 2020/104465, each of which is incorporated by reference herein in its entirety.

The pressure sensor 132 outputs pressure data that can be stored in the memory device 114 and/or analyzed by the processor 112 of the control system 110. In some implementations, the pressure sensor 132 is an air pressure sensor (e.g., barometric pressure sensor) that generates sensor data indicative of the respiration (e.g., inhaling and/or exhaling) of the user of the respiratory therapy system 120 and/or ambient pressure. In such implementations, the pressure sensor 132 can be coupled to or integrated in the respiratory therapy device 122. The pressure sensor 132 can be, for example, a capacitive sensor, an electromagnetic sensor, an inductive sensor, a resistive sensor, a piezoelectric sensor, a strain-gauge sensor, an optical sensor, a potentiometric sensor, or any combination thereof. In one example, the pressure sensor 132 can be used to determine a blood pressure of the user.

The flow rate sensor 134 outputs flow rate data that can be stored in the memory device 114 and/or analyzed by the processor 112 of the control system 110. In some implementations, the flow rate sensor 134 is used to determine an air flow rate from the respiratory therapy device 122, an air flow rate through the conduit 126, an air flow rate through the user interface 124, or any combination thereof. In such implementations, the flow rate sensor 134 can be coupled to or integrated in the respiratory therapy device 122, the user interface 124, or the conduit 126. The flow rate sensor 134 can be a mass flow rate sensor such as, for example, a rotary flow meter (e.g., Hall effect flow meters), a turbine flow meter, an orifice flow meter, an ultrasonic flow meter, a hot wire sensor, a vortex sensor, a membrane sensor, or any combination thereof.

The temperature sensor 136 outputs temperature data that can be stored in the memory device 114 and/or analyzed by the processor 112 of the control system 110. In some implementations, the temperature sensor 136 generates temperatures data indicative of a core body temperature of the user, a skin temperature of the user 210, a temperature of the air flowing from the respiratory therapy device 122 and/or through the conduit 126, a temperature in the user interface 124, an ambient temperature, or any combination thereof. The temperature sensor 136 can be, for example, a thermocouple sensor, a thermistor sensor, a silicon band gap temperature sensor or semiconductor-based sensor, a resistance temperature detector, or any combination thereof.

The motion sensor 138 outputs motion data that can be stored in the memory device 114 and/or analyzed by the processor 112 of the control system 110. The motion sensor 138 can be used to detect movement of the user during the sleep session, and/or detect movement of any of the components of the respiratory therapy system 120, such as the respiratory therapy device 122, the user interface 124, or the conduit 126. The motion sensor 138 can include one or more inertial sensors, such as accelerometers, gyroscopes, and magnetometers. The motion sensor 138 can be used to detect motion or acceleration associated with arterial pulses, such as pulses in or around the face of the user and proximal to the user interface 124, and configured to detect features of the pulse shape, speed, amplitude, or volume. In some implementations, the motion sensor 138 alternatively or additionally generates one or more signals representing bodily movement of the user, from which may be obtained a signal representing a sleep state of the user; for example, via a respiratory movement of the user.

The microphone 140 outputs acoustic data that can be stored in the memory device 114 and/or analyzed by the processor 112 of the control system 110. The acoustic data generated by the microphone 140 is reproducible as one or more sound(s) during a sleep session (e.g., sounds from the user) to determine (e.g., using the control system 110) one or more sleep-related parameters, as described in further detail herein. The acoustic data from the microphone 140 can also be used to identify (e.g., using the control system 110) an event experienced by the user during the sleep session, as described in further detail herein. In other implementations, the acoustic data from the microphone 140 is representative of noise associated with the respiratory therapy system 120. In some implementations, the system 100 includes a plurality of microphones (e.g., two or more microphones and/or an array of microphones with beamforming) such that sound data generated by each of the plurality of microphones can be used to discriminate the sound data generated by another of the plurality of microphones. The microphone 140 can be coupled to or integrated in the respiratory therapy system 120 (or the system 100) generally in any configuration. For example, the microphone 140 can be disposed inside the respiratory therapy device 122, the user interface 124, the conduit 126, or other components. The microphone 140 can also be positioned adjacent to or coupled to the outside of the respiratory therapy device 122, the outside of the user interface 124, the outside of the conduit 126, or outside of any other components. The microphone 140 could also be a component of the user device 170 (e.g., the microphone 140 is a microphone of a smart phone). The microphone 140 can be integrated into the user interface 124, the conduit 126, the respiratory therapy device 122, or any combination thereof. In general, the microphone 140 can be located at any point within or adjacent to the air pathway of the respiratory therapy system 120, which includes at least the motor of the respiratory therapy device 122, the user interface 124, and the conduit 126. Thus, the air pathway can also be referred to as the acoustic pathway.

The speaker 142 outputs sound waves that are typically audible to the user. In one or more implementations, the sound waves can be audible to a user of the system 100 or inaudible to the user of the system (e.g., ultrasonic sound waves). The speaker 142 can be used, for example, as an alarm clock or to play an alert or message to the user (e.g., in response to an event). In some implementations, the speaker 142 can be used to communicate the acoustic data generated by the microphone 140 to the user. The speaker 142 can be coupled to or integrated in the respiratory therapy device 122, the user interface 124, the conduit 126, or the user device 170.

The microphone 140 and the speaker 142 can be used as separate devices. In some implementations, the microphone 140 and the speaker 142 can be combined into an acoustic sensor 141 (e.g., a SONAR sensor), as described in, for example, WO 2018/050913 and WO 2020/104465, each of which is hereby incorporated by reference herein in its entirety. In such implementations, the speaker 142 generates or emits sound waves at a predetermined interval and/or frequency, and the microphone 140 detects the reflections of the emitted sound waves from the speaker 142. The sound waves generated or emitted by the speaker 142 have a frequency that is not audible to the human ear (e.g., below 20 Hz or above around 18 kHz) so as not to disturb the sleep of the user or a bed partner of the user (such as bed partner 220 in FIG. 2). Based at least in part on the data from the microphone 140 and/or the speaker 142, the control system 110 can determine a location of the user and/or one or more of the sleep-related parameters described in herein, such as, for example, a respiration signal, a respiration rate, an inspiration amplitude, an expiration amplitude, an inspiration-expiration ratio, a number of events per hour, a pattern of events, a sleep stage, pressure settings of the respiratory therapy device 122, a mouth leak status, or any combination thereof. In this context, a SONAR sensor may be understood to concern an active acoustic sensing, such as by generating/transmitting ultrasound or low frequency ultrasound sensing signals (e.g., in a frequency range of about 17-23 kHz, 18-22 kHz, or 17-18 kHz, for example), through the air. Such a system may be considered in relation to WO 2018/050913 and WO 2020/104465 mentioned above. In some implementations, the speaker 142 is a bone conduction speaker. In some implementations, the one or more sensors 130 include (i) a first microphone that is the same or similar to the microphone 140, and is integrated into the acoustic sensor 141 and (ii) a second microphone that is the same as or similar to the microphone 140, but is separate and distinct from the first microphone that is integrated into the acoustic sensor 141.

The RF transmitter 148 generates and/or emits radio waves having a predetermined frequency and/or a predetermined amplitude (e.g., within a high frequency band, within a low frequency band, long wave signals, short wave signals, etc.). The RF receiver 146 detects the reflections of the radio waves emitted from the RF transmitter 148, and this data can be analyzed by the control system 110 to determine a location of the user and/or one or more of the sleep-related parameters described herein. An RF receiver (either the RF receiver 146 and the RF transmitter 148 or another RF pair) can also be used for wireless communication between the control system 110, the respiratory therapy device 122, the one or more sensors 130, the user device 170, or any combination thereof. While the RF receiver 146 and RF transmitter 148 are shown as being separate and distinct elements in FIG. 1, in some implementations, the RF receiver 146 and RF transmitter 148 are combined as a part of an RF sensor 147 (e.g., a RADAR sensor). In some such implementations, the RF sensor 147 includes a control circuit. The specific format of the RF communication could be WiFi, Bluetooth, etc.

In some implementations, the RF sensor 147 is a part of a mesh system. One example of a mesh system is a WiFi mesh system, which can include mesh nodes, mesh router(s), and mesh gateway(s), each of which can be mobile/movable or fixed. In such implementations, the WiFi mesh system includes a WiFi router and/or a WiFi controller and one or more satellites (e.g., access points), each of which include an RF sensor that the is the same as, or similar to, the RF sensor 147. The WiFi router and satellites continuously communicate with one another using WiFi signals. The WiFi mesh system can be used to generate motion data based at least in part on changes in the WiFi signals (e.g., differences in received signal strength) between the router and the satellite(s) due to an object or person moving partially obstructing the signals. The motion data can be indicative of motion, breathing, heart rate, gait, falls, behavior, etc., or any combination thereof.

The camera 150 outputs image data reproducible as one or more images (e.g., still images, video images, thermal images, or a combination thereof) that can be stored in the memory device 114. The image data from the camera 150 can be used by the control system 110 to determine one or more of the sleep-related parameters described herein. For example, the image data from the camera 150 can be used to identify a location of the user, to determine a time when the user enters the user's bed (such as bed 230 in FIG. 2), and to determine a time when the user exits the bed 230. The camera 150 can also be used to track eye movements, pupil dilation (if one or both of the user's eyes are open), blink rate, or any changes during REM sleep. The camera 150 can also be used to track the position of the user, which can impact the duration and/or severity of apneic episodes in users with positional obstructive sleep apnea.

The IR sensor 152 outputs infrared image data reproducible as one or more infrared images (e.g., still images, video images, or both) that can be stored in the memory device 114. The infrared data from the IR sensor 152 can be used to determine one or more sleep-related parameters during the sleep session, including a temperature of the user and/or movement of the user. The IR sensor 152 can also be used in conjunction with the camera 150 when measuring the presence, location, and/or movement of the user. The IR sensor 152 can detect infrared light having a wavelength between about 700 nm and about 1 mm, for example, while the camera 150 can detect visible light having a wavelength between about 380 nm and about 740 nm.

The IR sensor 152 outputs infrared image data reproducible as one or more infrared images (e.g., still images, video images, or both) that can be stored in the memory device 114. The infrared data from the IR sensor 152 can be used to determine one or more sleep-related parameters during the sleep session, including a temperature of the user and/or movement of the user. The IR sensor 152 can also be used in conjunction with the camera 150 when measuring the presence, location, and/or movement of the user. The IR sensor 152 can detect infrared light having a wavelength between about 700 nm and about 1 mm, for example, while the camera 150 can detect visible light having a wavelength between about 380 nm and about 740 nm.

The PPG sensor 154 outputs physiological data associated with the user that can be used to determine one or more sleep-related parameters, such as, for example, a heart rate, a heart rate pattern, a heart rate variability, a cardiac cycle, respiration rate, an inspiration amplitude, an expiration amplitude, an inspiration-expiration ratio, estimated blood pressure parameter(s), or any combination thereof. The PPG sensor 154 can be worn by the user, embedded in clothing and/or fabric that is worn by the user, embedded in and/or coupled to the user interface 124 and/or its associated headgear (e.g., straps, etc.), etc.

The ECG sensor 156 outputs physiological data associated with electrical activity of the heart of the user. In some implementations, the ECG sensor 156 includes one or more electrodes that are positioned on or around a portion of the user during the sleep session. The physiological data from the ECG sensor 156 can be used, for example, to determine one or more of the sleep-related parameters described herein.

The EEG sensor 158 outputs physiological data associated with electrical activity of the brain of the user. In some implementations, the EEG sensor 158 includes one or more electrodes that are positioned on or around the scalp of the user during the sleep session. The physiological data from the EEG sensor 158 can be used, for example, to determine a sleep stage of the user at any given time during the sleep session. In some implementations, the EEG sensor 158 can be integrated in the user interface 124 and/or the associated headgear (e.g., straps, etc.).

The capacitive sensor 160, the force sensor 162, and the strain gauge sensor 164 output data that can be stored in the memory device 114 and used by the control system 110 to determine one or more of the sleep-related parameters described herein. The EMG sensor 166 outputs physiological data associated with electrical activity produced by one or more muscles. The oxygen sensor 168 outputs oxygen data indicative of an oxygen concentration of gas (e.g., in the conduit 126 or at the user interface 124). The oxygen sensor 168 can be, for example, an ultrasonic oxygen sensor, an electrical oxygen sensor, a chemical oxygen sensor, an optical oxygen sensor, or any combination thereof. In some implementations, the one or more sensors 130 also include a galvanic skin response (GSR) sensor, a blood flow sensor, a respiration sensor, a pulse sensor, a sphygmomanometer sensor, an oximetry sensor, or any combination thereof.

The analyte sensor 174 can be used to detect the presence of an analyte in the exhaled breath of the user. The data output by the analyte sensor 174 can be stored in the memory device 114 and used by the control system 110 to determine the identity and concentration of any analytes in the user's breath. In some implementations, the analyte sensor 174 is positioned near a mouth of the user to detect analytes in breath exhaled from the user's mouth. For example, when the user interface 124 is a facial mask that covers the nose and mouth of the user, the analyte sensor 174 can be positioned within the facial mask to monitor the user mouth breathing. In other implementations, such as when the user interface 124 is a nasal mask or a nasal pillow mask, the analyte sensor 174 can be positioned near the nose of the user to detect analytes in breath exhaled through the user's nose. In still other implementations, the analyte sensor 174 can be positioned near the user's mouth when the user interface 124 is a nasal mask or a nasal pillow mask. In this implementation, the analyte sensor 174 can be used to detect whether any air is inadvertently leaking from the user's mouth. In some implementations, the analyte sensor 174 is a volatile organic compound (VOC) sensor that can be used to detect carbon-based chemicals or compounds, such as carbon dioxide. In some implementations, the analyte sensor 174 can also be used to detect whether the user is breathing through their nose or mouth. For example, if the data output by an analyte sensor 174 positioned near the mouth of the user or within the facial mask (in implementations where the user interface 124 is a facial mask) detects the presence of an analyte, the control system 110 can use this data as an indication that the user is breathing through their mouth.

The moisture sensor 176 outputs data that can be stored in the memory device 114 and used by the control system 110. The moisture sensor 176 can be used to detect moisture in various areas surrounding the user (e.g., inside the conduit 126 or the user interface 124, near the user's face, near the connection between the conduit 126 and the user interface 124, near the connection between the conduit 126 and the respiratory therapy device 122, etc.). Thus, in some implementations, the moisture sensor 176 can be coupled to or integrated into the user interface 124 or in the conduit 126 to monitor the humidity of the pressurized air from the respiratory therapy device 122. In other implementations, the moisture sensor 176 is placed near any area where moisture levels need to be monitored. The moisture sensor 176 can also be used to monitor the humidity of the ambient environment surrounding the user, for example the air inside the user's bedroom. The moisture sensor 176 can also be used to track the user's biometric response to environmental changes.

One or more LiDAR sensors 178 can be used for depth sensing. This type of optical sensor (e.g., laser sensor) can be used to detect objects and build three dimensional (3D) maps of the surroundings, such as of a living space. LiDAR can generally utilize a pulsed laser to make time of flight measurements. LiDAR is also referred to as 3D laser scanning. In an example of use of such a sensor, a fixed or mobile device (such as a smartphone) having a LiDAR sensor 178 can measure and map an area extending 5 meters or more away from the sensor. The LiDAR data can be fused with point cloud data estimated by an electromagnetic RADAR sensor, for example. The LiDAR sensor 178 may also use artificial intelligence (AI) to automatically geofence RADAR systems by detecting and classifying features in a space that might cause issues for RADAR systems, such a glass windows (which can be highly reflective to RADAR). LiDAR can also be used to provide an estimate of the height of a person, as well as changes in height when the person sits down, or falls down, for example. LiDAR may be used to form a 3D mesh representation of an environment. In a further use, for solid surfaces through which radio waves pass (e.g., radio-translucent materials), the LiDAR may reflect off such surfaces, thus allowing a classification of different type of obstacles.

While shown separately in FIG. 1, any combination of the one or more sensors 130 can be integrated in and/or coupled to any one or more of the components of the system 100, including the respiratory therapy device 122, the user interface 124, the conduit 126, the humidification tank 129, the control system 110, the user device 170, or any combination thereof. For example, the acoustic sensor 141 and/or the RF sensor 147 can be integrated in and/or coupled to the user device 170. In such implementations, the user device 170 can be considered a secondary device that generates additional or secondary data for use by the system 100 (e.g., the control system 110) according to some aspects of the present disclosure. In some implementations, the pressure sensor 132 and/or the flow rate sensor 134 are integrated into and/or coupled to the respiratory therapy device 122. In some implementations, at least one of the one or more sensors 130 is not coupled to the respiratory therapy device 122, the control system 110, or the user device 170, and is positioned generally adjacent to the user during the sleep session (e.g., positioned on or in contact with a portion of the user, worn by the user, coupled to or positioned on the nightstand, coupled to the mattress, coupled to the ceiling, etc.). More generally, the one or more sensors 130 can be positioned at any suitable location relative to the user such that the one or more sensors 130 can generate physiological data associated with the user and/or the bed partner 220 during one or more sleep session.

The data from the one or more sensors 130 can be analyzed to determine one or more sleep-related parameters, which can include a respiration signal, a respiration rate, a respiration pattern, an inspiration amplitude, an expiration amplitude, an inspiration-expiration ratio, an occurrence of one or more events, a number of events per hour, a pattern of events, an average duration of events, a range of event durations, a ratio between the number of different events, a sleep stage, an apnea-hypopnea index (AHI), or any combination thereof. The one or more events can include snoring, apneas, central apneas, obstructive apneas, mixed apneas, hypopneas, an intentional user interface leak, an unintentional user interface leak, a mouth leak, a cough, a restless leg, a sleeping disorder, choking, an increased heart rate, labored breathing, an asthma attack, an epileptic episode, a seizure, increased blood pressure, hyperventilation, or any combination thereof. Many of these sleep-related parameters are physiological parameters, although some of the sleep-related parameters can be considered to be non-physiological parameters. Other types of physiological and non-physiological parameters can also be determined, either from the data from the one or more sensors 130, or from other types of data.

The user device 170 includes a display device 172. The user device 170 can be, for example, a mobile device such as a smart phone, a tablet, a laptop, a gaming console, a smart watch, or the like. Alternatively, the user device 170 can be an external sensing system, a television (e.g., a smart television) or another smart home device (e.g., a smart speaker(s) such as Google Home®, Google Nest®, Amazon Echo®, Amazon Echo Show®, Alexa®-enabled devices, etc.). In some implementations, the user device 170 is a wearable device (e.g., a smart watch). The display device 172 is generally used to display image(s) including still images, video images, or both. In some implementations, the display device 172 acts as a human-machine interface (HMI) that includes a graphic user interface (GUI) configured to display the image(s) and an input interface. The display device 172 can be an LED display, an OLED display, an LCD display, or the like. The input interface can be, for example, a touchscreen or touch-sensitive substrate, a mouse, a keyboard, or any sensor system configured to sense inputs made by a human user interacting with the user device 170. In some implementations, one or more user devices 170 can be used by and/or included in the system 100.

The blood pressure device 180 is generally used to aid in generating physiological data for determining one or more blood pressure measurements associated with a user. The blood pressure device 180 can include at least one of the one or more sensors 130 to measure, for example, a systolic blood pressure component and/or a diastolic blood pressure component.

In some implementations, the blood pressure device 180 is a sphygmomanometer including an inflatable cuff that can be worn by a user and a pressure sensor (e.g., the pressure sensor 132 described herein). For example, as shown in the example of FIG. 2, the blood pressure device 180 can be worn on an upper arm of the user. In such implementations where the blood pressure device 180 is a sphygmomanometer, the blood pressure device 180 also includes a pump (e.g., a manually operated bulb) for inflating the cuff. In some implementations, the blood pressure device 180 is coupled to the respiratory therapy device 122 of the respiratory therapy system 120, which in turn delivers pressurized air to inflate the cuff. More generally, the blood pressure device 180 can be communicatively coupled with, and/or physically integrated in (e.g., within a housing), the control system 110, the memory device 114, the respiratory therapy system 120, the user device 170, and/or the activity tracker 190.

The activity tracker 190 is generally used to aid in generating physiological data for determining an activity measurement associated with the user. The activity measurement can include, for example, a number of steps, a distance traveled, a number of steps climbed, a duration of physical activity, a type of physical activity, an intensity of physical activity, time spent standing, a respiration rate, an average respiration rate, a resting respiration rate, a maximum respiration rate, a respiration rate variability, a heart rate, an average heart rate, a resting heart rate, a maximum heart rate, a heart rate variability, a number of calories burned, blood oxygen saturation, electrodermal activity (also known as skin conductance or galvanic skin response), or any combination thereof. The activity tracker 190 includes one or more of the sensors 130 described herein, such as, for example, the motion sensor 138 (e.g., one or more accelerometers and/or gyroscopes), the PPG sensor 154, and/or the ECG sensor 156.

In some implementations, the activity tracker 190 is a wearable device that can be worn by the user, such as a smartwatch, a wristband, a ring, or a patch. For example, referring to FIG. 2, the activity tracker 190 is worn on a wrist of the user. The activity tracker 190 can also be coupled to or integrated a garment or clothing that is worn by the user. Alternatively, still, the activity tracker 190 can also be coupled to or integrated in (e.g., within the same housing) the user device 170. More generally, the activity tracker 190 can be communicatively coupled with, or physically integrated in (e.g., within a housing), the control system 110, the memory device 114, the respiratory therapy system 120, the user device 170, and/or the blood pressure device 180.

While the control system 110 and the memory device 114 are described and shown in FIG. 1 as being a separate and distinct component of the system 100, in some implementations, the control system 110 and/or the memory device 114 are integrated in the user device 170 and/or the respiratory therapy device 122. Alternatively, in some implementations, the control system 110 or a portion thereof (e.g., the processor 112) can be located in a cloud (e.g., integrated in a server, integrated in an Internet of Things (IoT) device, connected to the cloud, be subject to edge cloud processing, etc.), located in one or more servers (e.g., remote servers, local servers, etc., or any combination thereof.

While system 100 is shown as including all of the components described above, more or fewer components can be included in a system for determining a length of a conduit, according to implementations of the present disclosure. For example, a first alternative system includes the control system 110, the memory device 114, and at least one of the one or more sensors 130. As another example, a second alternative system includes the control system 110, the memory device 114, at least one of the one or more sensors 130, and the user device 170. As yet another example, a third alternative system includes the control system 110, the memory device 114, the respiratory therapy system 120, at least one of the one or more sensors 130, and the user device 170. As a further example, a fourth alternative system includes the control system 110, the memory device 114, the respiratory therapy system 120, at least one of the one or more sensors 130, the user device 170, and the blood pressure device 180 and/or activity tracker 190. Thus, various systems for modifying pressure settings can be formed using any portion or portions of the components shown and described herein and/or in combination with one or more other components.

Referring again to FIG. 2, in some implementations, the control system 110, the memory device 114, any of the one or more sensors 130, or a combination thereof can be located on and/or in any surface and/or structure that is generally adjacent to the bed 230 and/or the user 210. For example, in some implementations, at least one of the one or more sensors 130 can be located at a first position on and/or in one or more components of the respiratory therapy system 120 adjacent to the bed 230 and/or the user 210. The one or more sensors 130 can be coupled to the respiratory therapy system 120, the user interface 124, the conduit 126, the display device 128, the humidification tank 129, or a combination thereof.

Alternatively, or additionally, at least one of the one or more sensors 130 can be located at a second position on and/or in the bed 230 (e.g., the one or more sensors 130 are coupled to and/or integrated in the bed 230). Further, alternatively or additionally, at least one of the one or more sensors 130 can be located at a third position on and/or in the mattress 232 that is adjacent to the bed 230 and/or the user 210 (e.g., the one or more sensors 130 are coupled to and/or integrated in the mattress 232). Alternatively, or additionally, at least one of the one or more sensors 130 can be located at a fourth position on and/or in a pillow that is generally adjacent to the bed 230 and/or the user 210.

Alternatively, or additionally, at least one of the one or more sensors 130 can be located at a fifth position on and/or in the nightstand 240 that is generally adjacent to the bed 230 and/or the user 210. Alternatively, or additionally, at least one of the one or more sensors 130 can be located at a sixth position such that the at least one of the one or more sensors 130 are coupled to and/or positioned on the user 210 (e.g., the one or more sensors 130 are embedded in or coupled to fabric, clothing, and/or a smart device worn by the user 210). More generally, at least one of the one or more sensors 130 can be positioned at any suitable location relative to the user 210 such that the one or more sensors 130 can generate sensor data associated with the user 210.

In some implementations, a primary sensor, such as the microphone 140, is configured to generate acoustic data associated with the user 210 during a sleep session. The acoustic data can be based on, for example, acoustic signals in the conduit 126 of the respiratory therapy system 120. For example, one or more microphones (the same as, or similar to, the microphone 140 of FIG. 1) can be integrated in and/or coupled to (i) a circuit board of the respiratory therapy device 122, (ii) the conduit 126, (iii) a connector between components of the respiratory therapy system 120, (iv) the user interface 124, (v) a headgear (e.g., straps) associated with the user interface, or (vi) a combination thereof. In some implementations, the microphone 140 is in fluid communication with the airflow pathway (e.g., an airflow pathway between the flow generator/motor and the distal end of the conduit). By fluid communication, it is intended to also include configurations wherein the microphone is in acoustic communication with the airflow pathway without being in direct or physical contact with the airflow. For example, in some implementations, the microphone is positioned on a circuit board and in fluid communication, optionally via a duct sealed by a membrane, to the airflow pathway.

In some implementations, one or more secondary sensors may be used in addition to the primary sensor to generate additional data. In some such implementations, the one or more secondary sensors include: a microphone (e.g., the microphone 140 of the system 100), a flow rate sensor (e.g., the flow rate sensor 134 of the system 100), a pressure sensor (e.g., the pressure sensor 132 of the system 100), a temperature sensor (e.g., the temperature sensor 136 of the system 100), a camera (e.g., the camera 150 of the system 100), a vane sensor (VAF), a hot wire sensor (MAF), a cold wire sensor, a laminar flow sensor, an ultrasonic sensor, an inertial sensor, or a combination thereof.

Additionally, or alternatively, one or more microphones (the same as, or similar to, the microphone 140 of FIG. 1) can be integrated in and/or coupled to a co-located smart device, such as the user device 170, a TV, a watch (e.g., a mechanical watch or another smart device worn by the user), a pendant, the mattress 232, the bed 230, beddings positioned on the bed 230, the pillow, a speaker (e.g., the speaker 142 of FIG. 1), a radio, a tablet device, a waterless humidifier, or a combination thereof. A co-located smart device can be any smart device that is within range for detecting sounds emitted by the user, the respiratory therapy system 120, and/or any portion of the system 100. In some implementations, the co-located smart device is a smart device that is in the same room as the user during the sleep session.

Additionally, or alternatively, in some implementations, one or more microphones (the same as, or similar to, the microphone 140 of FIG. 1) can be remote from the system 100 (FIG. 1) and/or the user 210 (FIG. 2), so long as there is an air passage allowing acoustic signals to travel to the one or more microphones. For example, the one or more microphones can be in a different room from the room containing the system 100.

As used herein, a sleep session can be defined in a number of ways based at least in part on, for example, an initial start time and an end time. In some implementations, a sleep session is a duration where the user is asleep, that is, the sleep session has a start time and an end time, and during the sleep session, the user does not wake until the end time. That is, any period of the user being awake is not included in a sleep session. From this first definition of sleep session, if the user wakes ups and falls asleep multiple times in the same night, each of the sleep intervals separated by an awake interval is a sleep session.

Alternatively, in some implementations, a sleep session has a start time and an end time, and during the sleep session, the user can wake up, without the sleep session ending, so long as a continuous duration that the user is awake is below an awake duration threshold. The awake duration threshold can be defined as a percentage of a sleep session. The awake duration threshold can be, for example, about twenty percent of the sleep session, about fifteen percent of the sleep session duration, about ten percent of the sleep session duration, about five percent of the sleep session duration, about two percent of the sleep session duration, etc., or any other threshold percentage. In some implementations, the awake duration threshold is defined as a fixed amount of time, such as, for example, about one hour, about thirty minutes, about fifteen minutes, about ten minutes, about five minutes, about two minutes, etc., or any other amount of time.

In some implementations, a sleep session is defined as the entire time between the time in the evening at which the user first entered the bed, and the time the next morning when user last left the bed. Put another way, a sleep session can be defined as a period of time that begins on a first date (e.g., Monday, Jan. 6, 2020) at a first time (e.g., 10:00 PM), that can be referred to as the current evening, when the user first enters a bed with the intention of going to sleep (e.g., not if the user intends to first watch television or play with a smart phone before going to sleep, etc.), and ends on a second date (e.g., Tuesday, Jan. 7, 2020) at a second time (e.g., 7:00 AM), that can be referred to as the next morning, when the user first exits the bed with the intention of not going back to sleep that next morning.

In some implementations, the user can manually define the beginning of a sleep session and/or manually terminate a sleep session. For example, the user can select (e.g., by clicking or tapping) one or more user-selectable element that is displayed on the display device 172 of the user device 170 (FIG. 1) to manually initiate or terminate the sleep session.

Figure 3:
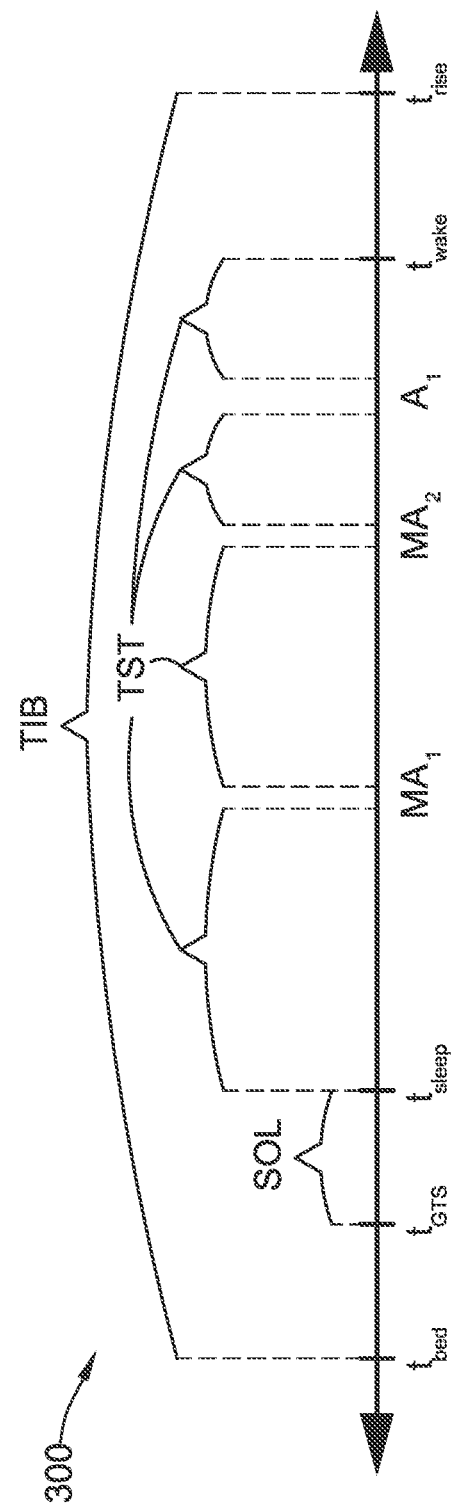
FIG. 3 illustrates an exemplary timeline for a sleep session, according to some implementations of the present disclosure.

Referring to FIG. 3, an exemplary timeline 300 for a sleep session is illustrated. The timeline 300 includes an enter bed time ($t_{bed}$), a go-to-sleep time ($t_{GTS}$), an initial sleep time ($t_{sleep}$), a first micro-awakening $MA_1$, a second micro-awakening $MA_2$, an awakening A, a wake-up time ($t_{wake}$), and a rising time ($t_{rise}$).

The enter bed time bed is associated with the time that the user initially enters the bed (e.g., bed 230 in FIG. 2) prior to falling asleep (e.g., when the user lies down or sits in the bed). The enter bed time $t_{bed}$ can be identified based at least in part on a bed threshold duration to distinguish between times when the user enters the bed for sleep and when the user enters the bed for other reasons (e.g., to watch TV). For example, the bed threshold duration can be at least about 10 minutes, at least about 20 minutes, at least about 30 minutes, at least about 45 minutes, at least about 1 hour, at least about 2 hours, etc. While the enter bed time $t_{bed}$ is described herein in reference to a bed, more generally, the enter time $t_{bed}$ can refer to the time the user initially enters any location for sleeping (e.g., a couch, a chair, a sleeping bag, etc.).

The go-to-sleep time (GTS) is associated with the time that the user initially attempts to fall asleep after entering the bed ($t_{bed}$). For example, after entering the bed, the user may engage in one or more activities to wind down prior to trying to sleep (e.g., reading, watching TV, listening to music, using the user device 170, etc.). The initial sleep time ($t_{sleep}$) is the time that the user initially falls asleep. For example, the initial sleep time ($t_{sleep}$) can be the time that the user initially enters the first non-REM sleep stage.

The wake-up time $t_{wake}$ is the time associated with the time when the user wakes up without going back to sleep (e.g., as opposed to the user waking up in the middle of the night and going back to sleep). The user may experience one of more unconscious microawakenings (e.g., microawakenings $MA_1$ and $MA_2$) having a short duration (e.g., 5 seconds, 10 seconds, seconds, 1 minute, etc.) after initially falling asleep. In contrast to the wake-up time $t_{wake}$, the user goes back to sleep after each of the microawakenings $MA_1$ and $MA_2$. Similarly, the user may have one or more conscious awakenings (e.g., awakening A) after initially falling asleep (e.g., getting up to go to the bathroom, attending to children or pets, sleep walking, etc.). However, the user goes back to sleep after the awakening A. Thus, the wake-up time $t_{wake}$ can be defined, for example, based at least in part on a wake threshold duration (e.g., the user is awake for at least 15 minutes, at least 20 minutes, at least 30 minutes, at least 1 hour, etc.).

Similarly, the rising time $t_{rise}$ is associated with the time when the user exits the bed and stays out of the bed with the intent to end the sleep session (e.g., as opposed to the user getting up during the night to go to the bathroom, to attend to children or pets, sleep walking, etc.). In other words, the rising time $t_{rise}$ is the time when the user last leaves the bed without returning to the bed until a next sleep session (e.g., the following evening). Thus, the rising time $t_{rise}$ can be defined, for example, based at least in part on a rise threshold duration (e.g., the user has left the bed for at least 15 minutes, at least 20 minutes, at least 30 minutes, at least 1 hour, etc.). The enter bed time $t_{bed}$ time for a second, subsequent sleep session can also be defined based at least in part on a rise threshold duration (e.g., the user has left the bed for at least 4 hours, at least 6 hours, at least 8 hours, at least 12 hours, etc.).

As described above, the user may wake up and get out of bed one more times during the night between the initial $t_{bed}$ and the final $t_{rise}$. In some implementations, the final wake-up time $t_{wake}$ and/or the final rising time $t_{rise}$ that are identified or determined based at least in part on a predetermined threshold duration of time subsequent to an event (e.g., falling asleep or leaving the bed). Such a threshold duration can be customized for the user. For a standard user which goes to bed in the evening, then wakes up and goes out of bed in the morning any period (between the user waking up ($t_{wake}$) or raising up ($t_{rise}$), and the user either going to bed ($t_{bed}$), going to sleep ($t_{GTS}$) or falling asleep ($t_{sleep}$) of between about 12 and about 18 hours can be used. For users that spend longer periods of time in bed, shorter threshold periods may be used (e.g., between about 8 hours and about 14 hours). The threshold period may be initially selected and/or later adjusted based at least in part on the system monitoring the user's sleep behavior.

The total time in bed (TIB) is the duration of time between the time enter bed time $t_{bed}$ and the rising time $t_{rise}$. The total sleep time (TST) is associated with the duration between the initial sleep time and the wake-up time, excluding any conscious or unconscious awakenings and/or micro-awakenings therebetween. Generally, the total sleep time (TST) will be shorter than the total time in bed (TIB) (e.g., one minute short, ten minutes shorter, one hour shorter, etc.). For example, referring to the timeline 300 of FIG. 3, the total sleep time (TST) spans between the initial sleep time $t_{sleep}$ and the wake-up time $t_{wake}$, but excludes the duration of the first micro-awakening $MA_1$, the second micro-awakening $MA_2$, and the awakening A. As shown, in this example, the total sleep time (TST) is shorter than the total time in bed (TIB).

In some implementations, the total sleep time (TST) can be defined as a persistent total sleep time (PTST). In such implementations, the persistent total sleep time excludes a predetermined initial portion or period of the first non-REM stage (e.g., light sleep stage). For example, the predetermined initial portion can be between about 30 seconds and about 20 minutes, between about 1 minute and about 10 minutes, between about 3 minutes and about 5 minutes, etc. The persistent total sleep time is a measure of sustained sleep, and smooths the sleep-wake hypnogram. For example, when the user is initially falling asleep, the user may be in the first non-REM stage for a very short time (e.g., about 30 seconds), then back into the wakefulness stage for a short period (e.g., one minute), and then goes back to the first non-REM stage. In this example, the persistent total sleep time excludes the first instance (e.g., about 30 seconds) of the first non-REM stage.

In some implementations, the sleep session is defined as starting at the enter bed time ($t_{bed}$) and ending at the rising time ($t_{rise}$), i.e., the sleep session is defined as the total time in bed (TIB). In some implementations, a sleep session is defined as starting at the initial sleep time ($t_{sleep}$) and ending at the wake-up time ($t_{wake}$). In some implementations, the sleep session is defined as the total sleep time (TST). In some implementations, a sleep session is defined as starting at the go-to-sleep time ($t_{GTS}$) and ending at the wake-up time ($t_{wake}$). In some implementations, a sleep session is defined as starting at the go-to-sleep time ($t_{GTS}$) and ending at the rising time ($t_{rise}$). In some implementations, a sleep session is defined as starting at the enter bed time ($t_{bed}$) and ending at the wake-up time ($t_{wake}$). In some implementations, a sleep session is defined as starting at the initial sleep time ($t_{sleep}$) and ending at the rising time ($t_{rise}$).

Figure 4:
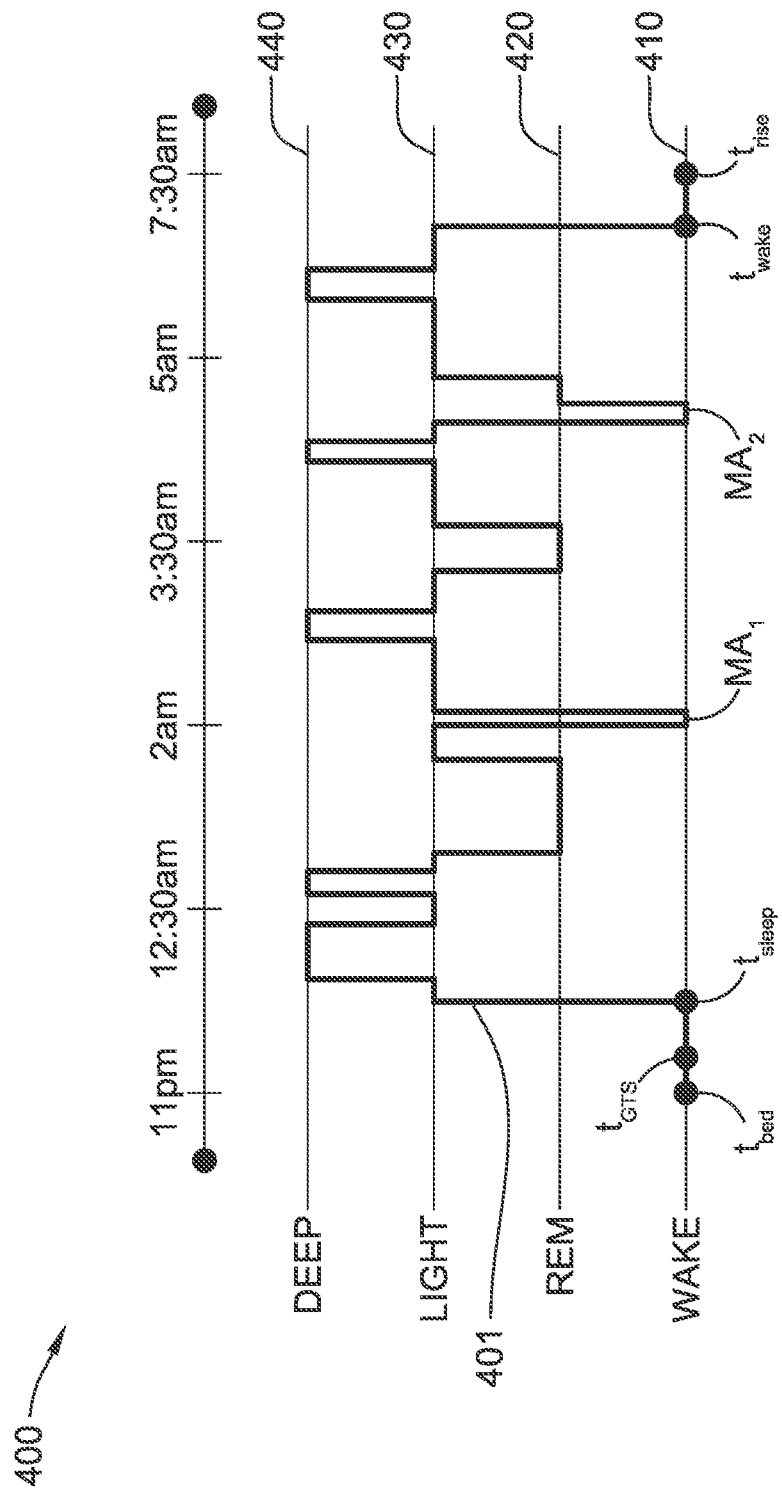
FIG. 4 illustrates an exemplary hypnogram associated with the sleep session of FIG. 3, according to some implementations of the present disclosure.

Referring to FIG. 4, an exemplary hypnogram 400 corresponding to the timeline 300 (FIG. 3), according to some implementations, is illustrated. As shown, the hypnogram 400 includes a sleep-wake signal 401, a wakefulness stage axis 410, a REM stage axis 420, a light sleep stage axis 430, and a deep sleep stage axis 440. The intersection between the sleep-wake signal 401 and one of the axes 410-440 is indicative of the sleep stage at any given time during the sleep session.

The sleep-wake signal 401 can be generated based at least in part on physiological data associated with the user (e.g., generated by one or more of the sensors 130 described herein). The sleep-wake signal can be indicative of one or more sleep stages, including wakefulness, relaxed wakefulness, microawakenings, a REM stage, a first non-REM stage, a second non-REM stage, a third non-REM stage, or any combination thereof. In some implementations, one or more of the first non-REM stage, the second non-REM stage, and the third non-REM stage can be grouped together and categorized as a light sleep stage or a deep sleep stage. For example, the light sleep stage can include the first non-REM stage and the deep sleep stage can include the second non-REM stage and the third non-REM stage. While the hypnogram 400 is shown in FIG. 4 as including the light sleep stage axis 430 and the deep sleep stage axis 440, in some implementations, the hypnogram 400 can include an axis for each of the first non-REM stage, the second non-REM stage, and the third non-REM stage. In other implementations, the sleep-wake signal can also be indicative of a respiration signal, a respiration rate, an inspiration amplitude, an expiration amplitude, an inspiration-expiration amplitude ratio, an inspiration-expiration duration ratio, a number of events per hour, a pattern of events, or any combination thereof. Information describing the sleep-wake signal can be stored in the memory device 114.

The hypnogram 400 can be used to determine one or more sleep-related parameters, such as, for example, a sleep onset latency (SOL), wake-after-sleep onset (WASO), a sleep efficiency (SE), a sleep fragmentation index, sleep blocks, or any combination thereof.

The sleep onset latency (SOL) is defined as the time between the go-to-sleep time ($t_{GTS}$) and the initial sleep time ($t_{sleep}$). In other words, the sleep onset latency is indicative of the time that it took the user to actually fall asleep after initially attempting to fall asleep. In some implementations, the sleep onset latency is defined as a persistent sleep onset latency (PSOL). The persistent sleep onset latency differs from the sleep onset latency in that the persistent sleep onset latency is defined as the duration time between the go-to-sleep time and a predetermined amount of sustained sleep. In some implementations, the predetermined amount of sustained sleep can include, for example, at least 10 minutes of sleep within the second non-REM stage, the third non-REM stage, and/or the REM stage with no more than 2 minutes of wakefulness, the first non-REM stage, and/or movement therebetween. In other words, the persistent sleep onset latency requires up to, for example, 8 minutes of sustained sleep within the second non-REM stage, the third non-REM stage, and/or the REM stage. In other implementations, the predetermined amount of sustained sleep can include at least 10 minutes of sleep within the first non-REM stage, the second non-REM stage, the third non-REM stage, and/or the REM stage subsequent to the initial sleep time. In such implementations, the predetermined amount of sustained sleep can exclude any micro-awakenings (e.g., a ten second micro-awakening does not restart the 10-minute period).

The wake-after-sleep onset (WASO) is associated with the total duration of time that the user is awake between the initial sleep time and the wake-up time. Thus, the wake-after-sleep onset includes short and micro-awakenings during the sleep session (e.g., the micro-awakenings $MA_1$ and $MA_2$ shown in FIG. 4), whether conscious or unconscious. In some implementations, the wake-after-sleep onset (WASO) is defined as a persistent wake-after-sleep onset (PWASO) that only includes the total durations of awakenings having a predetermined length (e.g., greater than 10 seconds, greater than 30 seconds, greater than 60 seconds, greater than about 5 minutes, greater than about 10 minutes, etc.)

The sleep efficiency (SE) is determined as a ratio of the total time in bed (TIB) and the total sleep time (TST). For example, if the total time in bed is 8 hours and the total sleep time is 7.5 hours, the sleep efficiency for that sleep session is 93.75%. The sleep efficiency is indicative of the sleep hygiene of the user. For example, if the user enters the bed and spends time engaged in other activities (e.g., watching TV) before sleep, the sleep efficiency will be reduced (e.g., the user is penalized). In some implementations, the sleep efficiency (SE) can be calculated based at least in part on the total time in bed (TIB) and the total time that the user is attempting to sleep. In such implementations, the total time that the user is attempting to sleep is defined as the duration between the go-to-sleep (GTS) time and the rising time described herein. For example, if the total sleep time is 8 hours (e.g., between 11 PM and 7 AM), the go-to-sleep time is 10:45 PM, and the rising time is 7:15 AM, in such implementations, the sleep efficiency parameter is calculated as about 94%.

The fragmentation index is determined based at least in part on the number of awakenings during the sleep session. For example, if the user had two micro-awakenings (e.g., micro-awakening $MA_1$ and micro-awakening $MA_2$ shown in FIG. 4), the fragmentation index can be expressed as 2. In some implementations, the fragmentation index is scaled between a predetermined range of integers (e.g., between 0 and 10).

The sleep blocks are associated with a transition between any stage of sleep (e.g., the first non-REM stage, the second non-REM stage, the third non-REM stage, and/or the REM) and the wakefulness stage. The sleep blocks can be calculated at a resolution of, for example, seconds.

In some implementations, the systems and methods described herein can include generating or analyzing a hypnogram including a sleep-wake signal to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof based at least in part on the sleep-wake signal of a hypnogram.

In other implementations, one or more of the sensors 130 can be used to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof, which in turn define the sleep session. For example, the enter bed time $t_{bed}$ can be determined based at least in part on, for example, data generated by the motion sensor 138, the microphone 140, the camera 150, or any combination thereof. The go-to-sleep time can be determined based at least in part on, for example, data from the motion sensor 138 (e.g., data indicative of no movement by the user), data from the camera 150 (e.g., data indicative of no movement by the user and/or that the user has turned off the lights), data from the microphone 140 (e.g., data indicative of the using turning off a TV), data from the user device 170 (e.g., data indicative of the user no longer using the user device 170), data from the pressure sensor 132 and/or the flow rate sensor 134 (e.g., data indicative of the user turning on the respiratory therapy device 122, data indicative of the user donning the user interface 124, etc.), or any combination thereof.

Figure 5:
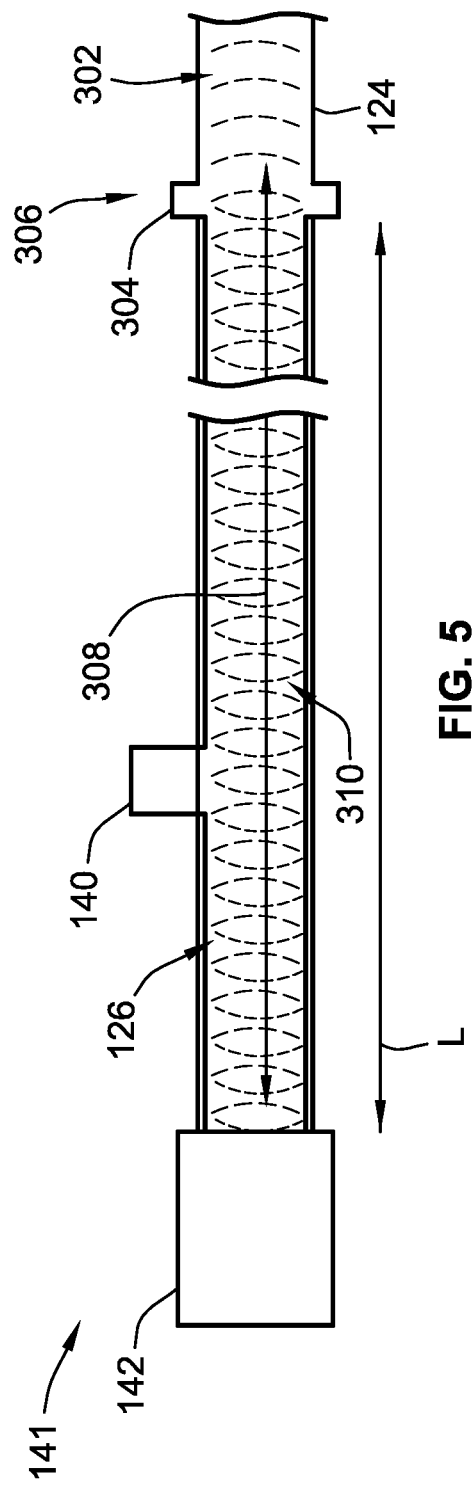
FIG. 5 illustrates the generation of acoustic data in response to an acoustic reflection indicative of one or more features of a user interface and/or a conduit, according to some implementations of the present disclosure.

FIG. 5 illustrates the generation of acoustic data in response to a reflection of an acoustic signal, according to aspects of the present disclosure. As shown in FIG. 5, the speaker 142 can be used to emit an acoustic signal 302 that propagates within the conduit 126. The microphone 140 can be used to detect the reflections 310 of the acoustic signal 302, and generate acoustic data representative of the reflections 310. In the illustrated implementations, the speaker 142 is used to generate and emit the acoustic signal 302. However, in other implementations, the speaker 142 can instead be replaced by another device that can generate an acoustic signal, such as the motor of the respiratory therapy device 122. The microphone 140 and speaker 142 are shown in specific locations relative to the conduit 126, which is connected to the respiratory therapy device 122 (not shown). However, the locations of the microphone 140 and the speaker 142 can vary from what is shown. For example, FIG. 5 shows the microphone 140 in fluid communication with the interior of the conduit 126 but protruding from the periphery of the conduit 126. The housing of the microphone 140 could be coupled to the exterior of the conduit 126 over an aperture, such that the microphone 140 is in fluid communication with the interior of the conduit 126. The microphone 140 could also be placed within a duct that is coupled to the conduit 126 over an aperture. However, the microphone 140 can generally be disposed in any location where the microphone 140 is able to detect the required acoustic signals and/or reflections and generate the required acoustic data. For example, the microphone 140 could be disposed entirely within the conduit 126. The microphone 140 can also be disposed generally anywhere within the air pathway that the conduit 126 is part of. As discussed herein, the respiratory therapy system 120 forms an air pathway that generally includes the motor of the respiratory therapy device 122, the user interface 124, the conduit 126, and any other elements or devices that may be used to deliver pressurized air to the user's airway. The microphone 140 can generally be placed anywhere within or adjacent to this air pathway, so long as the microphone 140 is in fluid communication with the air pathway (e.g., is able to detect the acoustic reflections 310 (and/or any other desired acoustic signals and/or reflections) and generate acoustic data representative thereof).

The speaker 142 emits the acoustic signal 302 within the conduit 126. The acoustic signal 302 is in the form of a sound. The sound can be one or more of a standard sound (e.g., an original, unmodified sound from an off-the-shelf sound application), a custom sound, an inaudible frequency, a white noise sound, a broad band impulse, a continuous sinusoidal waveform, a square waveform, a sawtooth waveform, and a frequency modulated sinusoid (e.g., chirp). According to some other implementations, the acoustic signal 302 can be in the form of one or more of an audible sound or an ultrasonic sound. According to some other implementations, the acoustic signal 302 is in the form of an inaudible sound, where the sound is inaudible based on one or both of the frequency of the sound (e.g., the frequency being outside of the frequency range for human hearing) or the amplitude of the sound (e.g., the amplitude being low enough that the sound is not loud enough for human perception).

In one or more implementations, the acoustic signal 302 is emitted at specific times, such as when the user first puts on the user interface, after the user takes off the user interface, after detecting that an apnea event or a hypopnea event is occurring (e.g., after detecting using a respiratory therapy device that an apnea event or a hypopnea event is occurring). For example, the specific monitoring times are selected to be at intervals of 0.1 seconds for a duration of at least 4 seconds.

As the acoustic signal 302 travels down the length L of the conduit 126, the acoustic signal 302 can contact physical features of the conduit 126 and/or the user interface 124, such as feature 304. In FIG. 5, feature 304 is positioned at or near a connection 306 of the user interface 124 with the conduit 126. The feature 304 includes a widening of a pathway 308 through which the acoustic signal 302 propagates, that is formed at the connection 306. The widening at the feature 304 causes a change in the acoustic impedance of the acoustic signal 302 and an acoustic reflection 310. The acoustic reflection 310 travels back down the length L of the conduit 126 until it reaches the microphone 140. The microphone 140 detects the acoustic reflection 310 and generates acoustic data in response to the acoustic reflection 310. The acoustic data is thus representative of the acoustic reflections 310 propagating within the conduit 126. The acoustic data may also be representative of the original acoustic signal 302, and any other acoustic signals (e.g., sound waves) that may be propagating within the conduit 126 and/or near the microphone 140.

The microphone 140 can thus detect the reflections 310 due to the feature 304, as well as a variety of other reflections of the acoustic signal 302. In some implementations, the reflections 310 can be used to determine the length of the conduit. The acoustic data that is representative of the acoustic reflections 310 can be used to generate time-domain intensity signal. The time-domain intensity signal is a measure of the intensity and/or amplitude of the reflections 310 over a time period, as measured by the microphone 140. The time-domain intensity signal can be converted into a frequency-domain intensity signal, which in turn can be used to determine the length of the conduit 126.

In some implementations, the acoustic data represents a plurality of reflections from a plurality of acoustic signals, and thus the time-domain intensity signal can represent the reflections of more than just the acoustic signal 302. For example, reflections from each of a plurality of acoustic signals can be averaged together, and the time-domain intensity signal can be generated from this average.

Figure 6A:
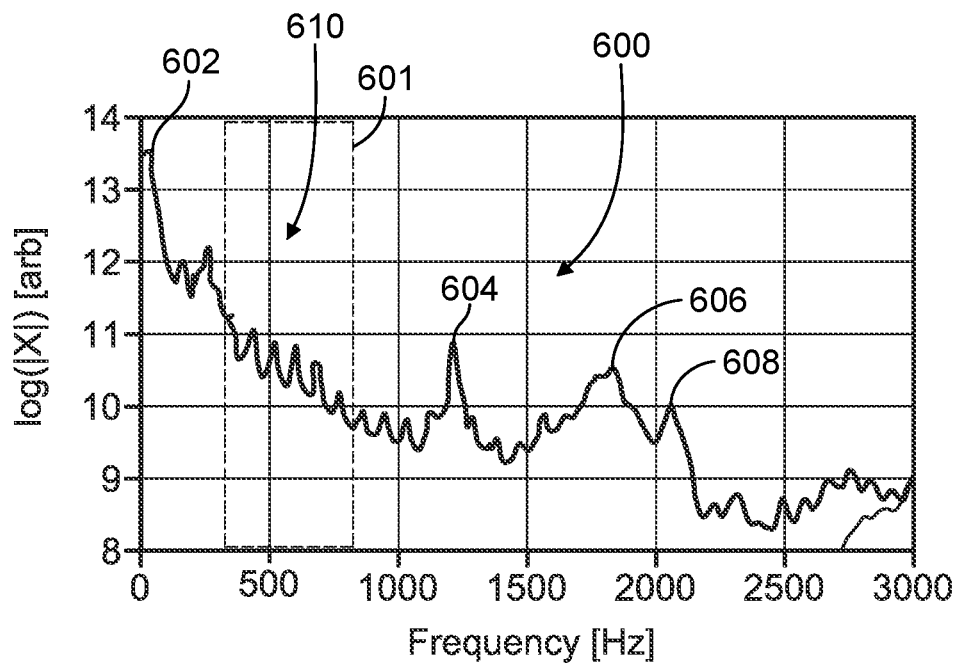
FIG. 6A illustrates a plot of a frequency-domain intensity signal based on the generated acoustic data, according to some implementations of the present disclosure.

FIG. 6A shows a plot of a frequency-domain intensity signal 600 that can be obtained from the time-domain intensity signal. In some implementations, the frequency-domain intensity signal 600 can be obtained from the time-domain intensity signal by taking the Fourier Transform of the time-domain intensity signal. The frequency-domain intensity signal 600 represents the intensity of various different frequencies of the acoustic reflections 310 across a frequency band. Thus, the frequency-domain intensity signal 600 shows the frequency spectrum of the reflections 310 of the acoustic signal 302. In FIG. 6A, the Y-axis represents the absolute value of the intensity of the reflection 310, denoted as |x|. The intensity is plotted on a log-scale, using arbitrary units. The X-axis represents the frequency of the reflections 310, measured in Hertz (Hz). In some implementations, the intensity is plotted on an absolute scale instead of a log-scale.

The frequency-domain intensity signal 600 in FIG. 6A represents the various frequencies of the reflections 310 from the acoustic signal 302. The acoustic signal 302 and the reflections 310 form standing waves within the conduit 126 and/or the user interface 124. The conduit 126 can support standing waves at a variety of different frequencies therein. Generally, the lowest frequency of standing wave that is supported by the conduit 126 is referred to as the resonant frequency.

The wavelength of a standing wave at the resonant frequency can be obtained from the resonant frequency, and is generally equal to $2L_c$, where $L_c$ is the length of the conduit 126. The intensity of a standing wave propagating within the conduit 126 at the resonant frequency is generally larger than the intensities of standing waves propagating within the conduit 126 at frequencies other than the resonant frequency.

The frequency-domain intensity signal 600 shows the intensity of standing waves propagating within the conduit 126 that have a variety of different frequencies. The peaks in the frequency-domain intensity signal 600 correspond to different standing waves supported within the conduit 126. However, because the conduit 126 is coupled to both the respiratory therapy device 122 and the user interface 124, the frequency-domain intensity signal 600 also represents standing waves that partially propagate within the respiratory therapy device 122, the user interface 124, or both. Thus, some of the peaks of the frequency-domain intensity signal 600 correspond to standing waves that propagate partially within the respiratory therapy device 122, the user interface 124, or both.

For example, the frequency-domain intensity signal 600 includes a peak 602 at a low frequency, that is larger than the rest of the peaks of the frequency-domain intensity signal 600. Peak 602 can correspond to a standing wave that propagated primarily within the respiratory therapy device 122. The frequency-domain intensity signal 600 also includes peaks 604, 606, and 608 that represent standing waves that at least partially propagate within the user interface 124. Finally, the frequency-domain intensity signal 600 includes a series of peaks 610 that are located within portion 601 of the frequency-domain intensity signal 600. As is shown in FIG. 6A, the peaks 610 are arranged in a generally periodic series of peaks that have decreasing intensities. The series of peaks 610 primarily correspond to standing waves propagating at the resonant frequency of the conduit 126, and higher order harmonics of the resonant frequency, although the peaks 610 may also correspond to standing waves propagating at the resonant frequency of the user interface 124 and higher order harmonics thereof. These higher order harmonics are standing waves with a wavelength that is equal to $2L_c/n$, where n is a positive integer greater than or equal to two.

Figure 6B:
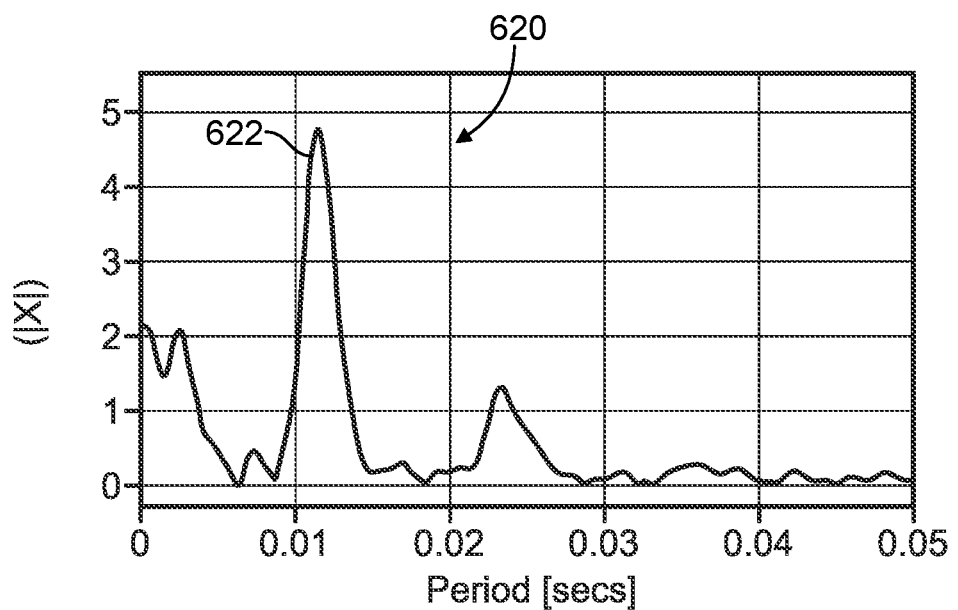
FIG. 6B illustrates a plot of a wave period intensity signal based on the frequency-domain intensity signal of FIG. 6A, according to some implementations of the present disclosure.

FIG. 6B shows a plot of a wave period intensity signal 620 that can be obtained from the frequency-domain intensity signal 600. In some implementations, the wave period intensity signal 620 is obtained by taking the Fourier transform of the portion 601 of the frequency-domain intensity signal 600 that contains the periodic series of peaks 610. The wave period intensity signal 620 plots the intensity of the reflections 310 within the portion 601 of the frequency-domain intensity signal, against the period of the standing waves. The Y-axis of the plot represents the intensity of the reflections 310, denoted as |x|. The intensity is plotted on an absolute scale. The X-axis represents the period of the reflections 310 within portion 601 of the frequency-domain intensity signal 600, measured in seconds. (e.g., the inverse of the frequency).

As shown, the wave period intensity signal 620 contains a peak 622 that is substantially larger than the other peaks in the wave period intensity signal 620. Because peak 622 is larger than the other peaks, peak 622 corresponds to the standing wave propagating at the resonant frequency of the conduit 126. The location of the peak 622 along the X-axis represents the period of the standing wave propagating at the resonant frequency. By taking the inverse of the period of this standing wave, the resonant frequency can be determined. In turn, the wavelength $\lambda$ of this standing wave is generally equally to v/f, where v is the speed of sound within the conduit 126. In some implementations, the speed of sound v is based at least in part on the temperature and/or the humidity of the air within the conduit 126. Once the wavelength of the standing wave propagating at the resonant frequency is known, the length of the conduit 126 can be determined from $\lambda=2L_c$ is the inverse of its frequency. Thus, the length of the conduit 126 is proportional to the wavelength of a standing wave propagating at the resonant frequency, and inversely proportional to the resonant frequency.

In some implementations, a peak different than peak 622 may be selected as the peak representing the resonant frequency of the conduit 126. For example, due to the presence of the respiratory therapy device 122 and/or the user interface 124, the intensities of standing waves propagating at frequencies other than the resonant frequency may appear larger than the peak that actually represents the resonant frequency of the standing wave. In these cases, the lowest frequency peak of the wave period intensity signal 620 may be selected as representing the resonant frequency of the conduit 126.

Taking the Fourier Transform of the initial time-domain intensity signal and of the frequency-domain intensity signal 600, along with any pre-processing steps, generally minimizes the noise in the data, to allow the resonant frequency of the conduit to be determined more easily. However, in some implementations, the resonant frequency can be determined from the frequency-domain intensity signal 600, instead of from the wave period intensity signal. For example, the resonant frequency may be selected directly from the series of peaks 610 in the frequency-domain intensity signal 600. The peak of the series of peaks 610 having the lowest frequency can be selected as representing the resonant frequency of the conduit 126.

In some implementations, instead of applying a Fourier Transform to the frequency-domain intensity signal to obtain the wave period intensity signal, other transformations and/or analyses may be applied. For example, an inverse Fourier Transform can be applied to the frequency-domain intensity signal 600 to obtain a new time-domain intensity signal, and the resonant frequency can be identified from the new time-domain intensity signal. In another example, a cross-correlation analysis can be applied to the initial time-domain intensity signal and the frequency-domain intensity signal 600, in order to determine the resonant frequency of the conduit 126.

Figure 7A:
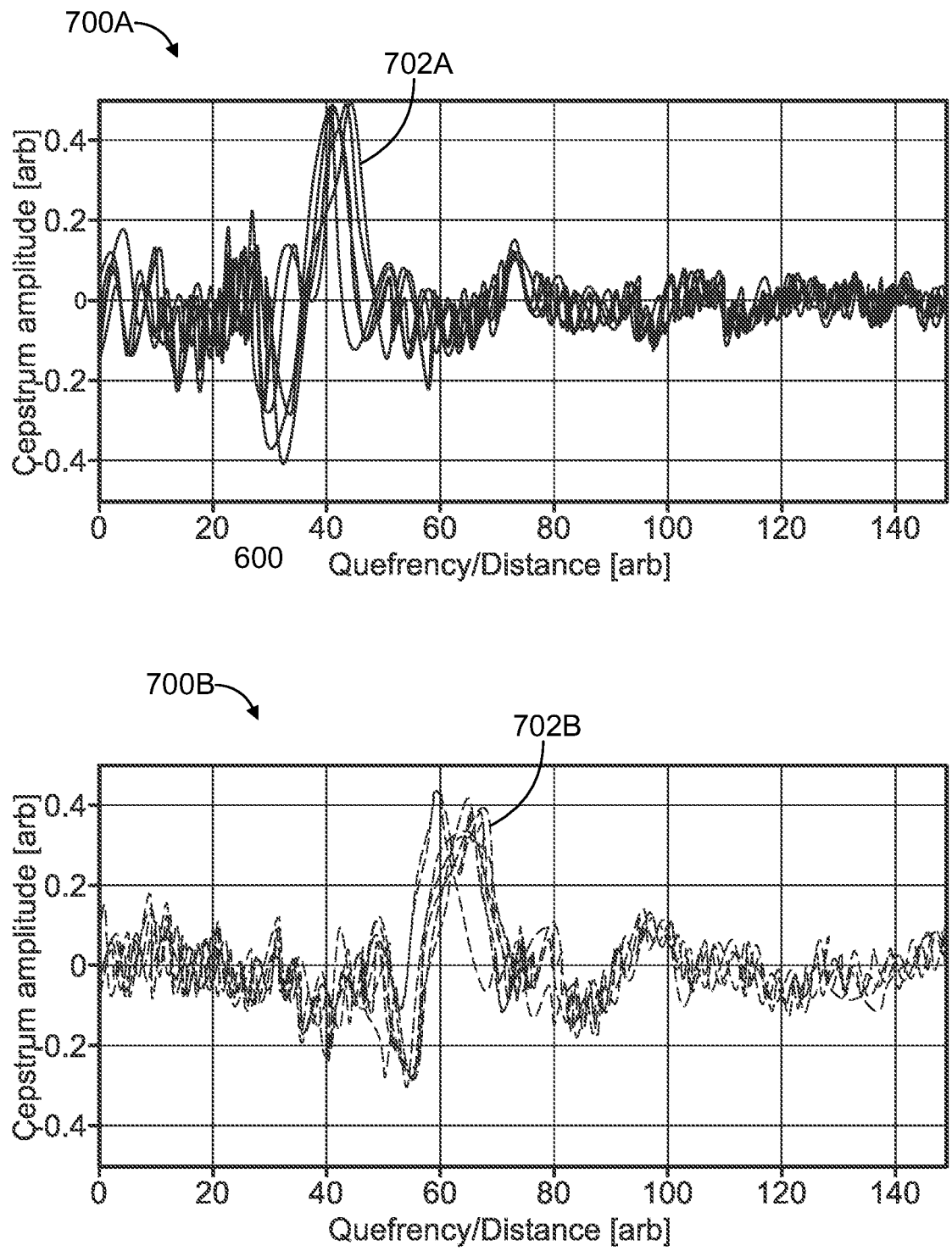
FIG. 7A illustrates a first plot of a cepstrum calculated from acoustic data generated using a first conduit, and a second plot of a cepstrum calculated from acoustic data generated using a second conduit, according to some implementations of the present disclosure.
Figure 7B:
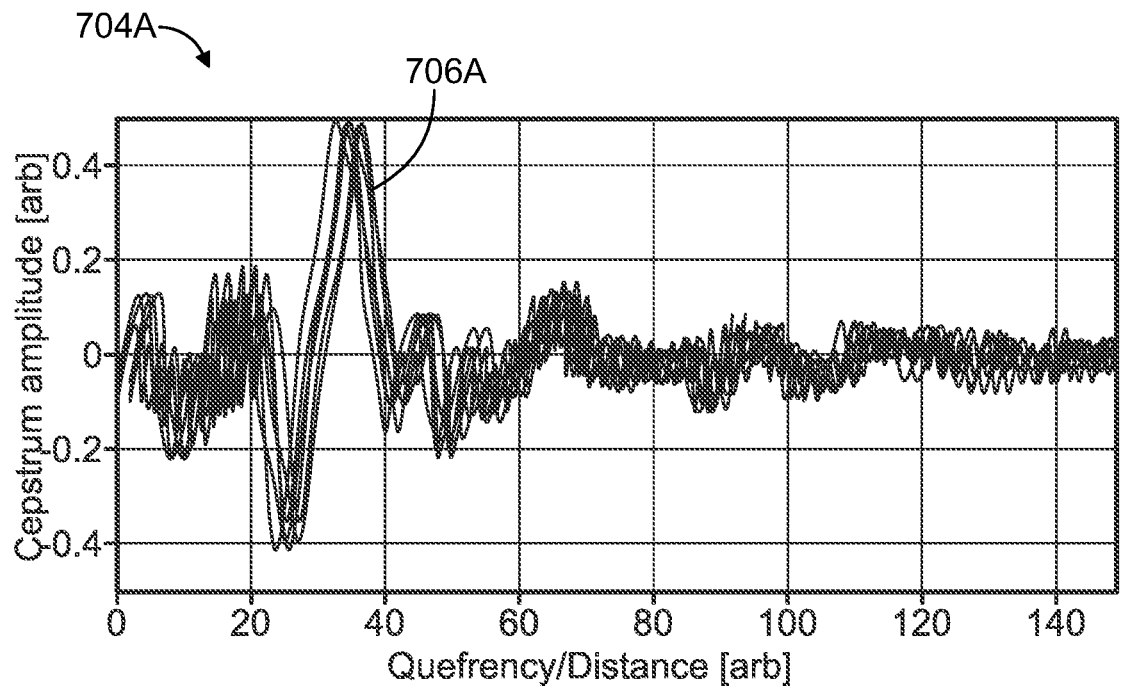
FIG. 7B illustrates a first plot of a corrected cepstrum based on the first cepstrum of FIG. 7A, and a second plot of a corrected cepstrum based on the second cepstrum of FIG. 7A, according to some implementations of the present disclosure.
Figure 7B:
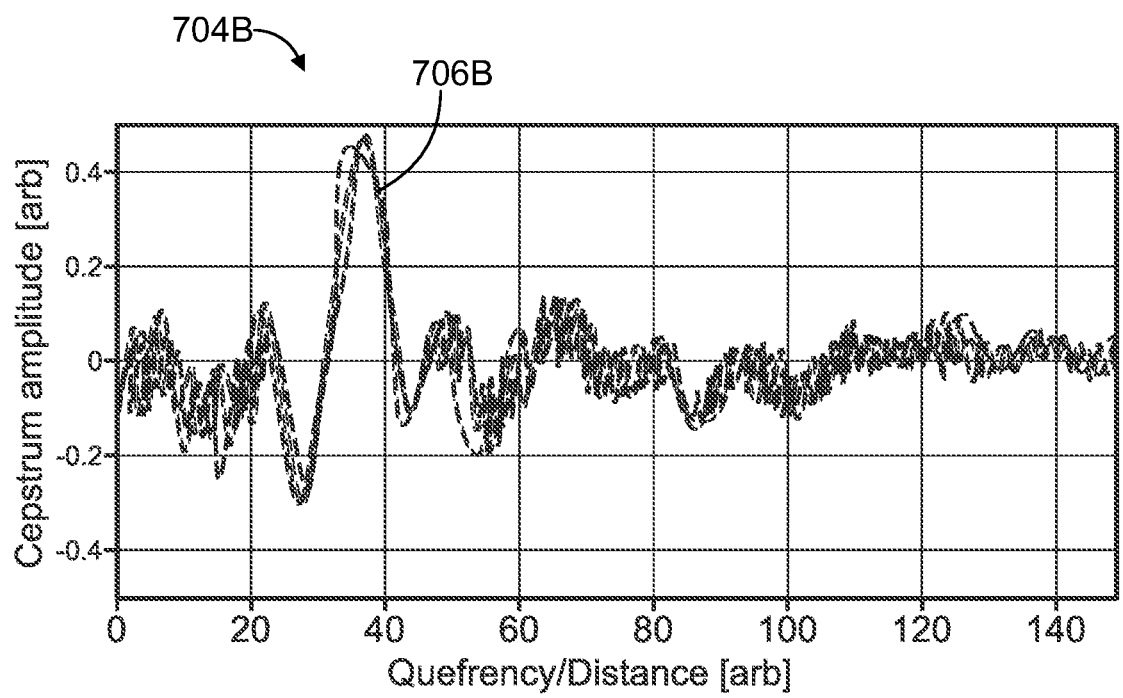

Referring now to FIGS. 7A and 7B, the determined length of the conduit 126 can be used to adjust a characterization and/or a categorization of the user interface 124, based on the acoustic data. In some implementations, the acoustic data can be analyzed to identify features indicative of the user interface 124, and the acoustic data can thus be used to characterize and/or categorize the user interface 124. Generally, characterizing the user interface refers to determining the specific type, manufacturer, model, etc. of user interface. For example, characterizing the user interface can include determining whether the user interface is nasal mask, a nasal pillow mask, a full-face mask, etc. Characterization can also include determining a form factor of the user interface and/or determining a size of any individual elements or components of the user interface. As such, characterization of a user interface can include identification of a specific user interface from a body of user interfaces that are available to a user of a respiratory therapy system.

Categorization generally refers to determining into which of certain user interface categories that the user interface falls. In some implementations, these user interface categories can include user interface categories related to the type of connection that the user interface has with the conduit. A first user interface category is associated with a direct connection, in which the conduit is connected directly to the user interface, or directly to a connector (such as an elbow connector) that is itself directly connected to the user interface, such that pressurized air is delivered directly from the conduit into a chamber formed by a cushion and/or a frame of the user interface. A second user interface category is associated with an indirect connection, in which some additional element—other than the connector—is connected between the conduit and the cushion and/or frame of the user interface, such that pressurized air is delivered indirectly from the conduit into the chamber formed by the cushion and/or frame of the user interface. In some cases, the additional element can be a user interface conduit (often referred to in the art as a "minitube" or a "flexitube") that is more flexible than the conduit 126, has a different diameter than the conduit 126, has a different length than the conduit 126, or any combination thereof.

The user interface categories can also include an indirect headgear category and an indirect conduit category. For the indirect headgear category, the conduit of the respiratory therapy system connects to a user interface conduit (optionally via a connector) that is formed as part of the headgear of the user interface. This user interface conduit can be referred to as a headgear conduit. The headgear conduit in turn connects to the cushion (or cushion and frame). The headgear is therefore configured to deliver the pressurized air from the conduit of the respiratory therapy system to the cushion (or cushion and frame) of the user interface. This headgear conduit within the headgear of the user interface is therefore configured to deliver the pressurized air from the conduit of the respiratory therapy system to the cushion of the user interface. For the indirect conduit category, the conduit connects to a user interface conduit that is not formed as part of the headgear of the user interface (e.g., a non-headgear conduit). For example, the user interface conduit for the indirect conduit category may simply be positioned in front of the cushion and/or frame of the user interface. Thus, categorizing the user interface can include determining which user interface category or user interface categories the user interface belongs to.

Generally, the length of the conduit 126 is assumed when the user interface 124 is characterized and/or categorized. However, if the conduit 126 has a length that is different than expected, the characterization and/or categorization of the user interface 124 may need to be adjusted. The characterization and/or categorization of the user interface 124 that the user is wearing can impact various factors relating to the operation of the respiratory therapy system 120, including the pressure of the pressurized air provided to the user.

FIG. 7A shows an upper plot of cepstrum 700A, and a lower plot of a cepstrum 700B. Cepstrum 700A was determined from acoustic data generated a user interface 124 and a first type of conduit 126. Cepstrum 700B was determined from acoustic data generated from the same user interface 124, but a second type of conduit 126. For example, the first type of conduit 126 can be a ResMed® SlimLine® conduit, while the second type of conduit 126 can be a ResMed® ClimateLine® conduit. The first and second type of conduits 126 have different lengths.

The cepstrums 700A and 700B are shown with quefrency on the X-axis and amplitude on the Y-axis. In these implementations, the quefrency corresponds to a measure of distance along the pathway through which the acoustic signal propagates. The cepstrums 700A and 700B are thus used to show the distances along this pathway that are associated with reflections of the acoustic signal. The reflections in turn are associated with various features of the user interface. Thus, the cepstrums 700A and 700B can be used to characterize and/or categorize the respective user interfaces 124. While the illustrated implementation shows using cepstrums to characterize and/or categorize the user interface 124, the analysis of the acoustic data can generally include performing any deconvolution of the acoustic data. The deconvolution of the acoustic data can then be used to characterize and/or categorize the user interface 124. A cepstrum is a specific type of deconvolution that can be utilized.

Additional details related to the characterization and/or categorization of the user interface 124 can be found at least in paragraphs [0075]-[0110] and FIGS. 3-8 of U.S. Provisional App. No. 63/036,303, filed Jun. 8, 2020, entitled "Systems and Methods for Characterizing a User Interface,"; at least in paragraphs [0139]-[0168] and FIGS. 12A-21 of U.S. Provisional App. No. 63/108,161, filed Oct. 30, 2020, entitled "Systems and Methods for Categorizing and/or Characterizing a User Interface,"; and at least in paragraphs [0142]-[0216] and FIGS. 5-23 of PCT App. No. PCT/IB2021/054999, filed Jun. 7, 2021, entitled "Systems and Methods for Categorizing and/or Characterizing a User Interface,", each of which is hereby incorporated by reference herein in its entirety.

Because the two cepstrums 700A and 700B are determined from acoustic data generated using the same user interface 124, the two cepstrums 700A and 700B should generally have the same pattern. However, the different lengths of the conduit 126 result in cepstrum 700B being distorted. As shown in FIG. 7A, cepstrum 700B is stretched or smeared relative to cepstrum 700A. For example, cepstrum 700B includes a peak 702B that is positioned forward relative to a corresponding peak 702A of cepstrum 700A, due to the stretching or smearing of cepstrum 700B. The distortion of cepstrum 700B due to the different length of the conduit can also impact the position of the peaks along the Y-axis. If cepstrum 700B is stretched relative to what would be expected from the expected length of the conduit 126 used to obtain cepstrum 700B, the peaks may be shorter along the Y-axis than they would otherwise be. Conversely, if the length of the conduit 126 was shorter than expected, the cepstrum 700B could be compressed relative to normal, and the peaks may be taller along the Y-axis than they would otherwise be. Thus, any features of the user interface 124 obtainable from cepstrum 700B will be different than features of the user interface 124 obtainable from to cepstrum 700A, even though both cepstrums were generated using the same user interface 124. Thus, as shown in FIG. 7A, the length of the conduit 126 can negatively affect the characterization of the user interface 124.

FIG. 7B shows an upper plot of a corrected cepstrum 704A, and a lower plot of a corrected cepstrum 704B. Cepstrum 704A is a corrected version of cepstrum 700A and includes a peak 706A. Cepstrum 704B is a corrected version of cepstrum 700B and includes a peak 706B. The cepstrums 704A and 704B have been corrected by scaling the cepstrums 700A and 700B by a factor equal to the ratio of (i) the measured length of each respective conduit 126 to (ii) the assumed length of the conduits 126. For example, if a particular conduit was assumed to be 2 meters long, and the analysis of the conduit revealed that the conduit was actually 1.8 meters long, the new position along the X-axis of each data point of the cepstrum would be equal to the old position along the X-axis, multiplied by 1.8/2. As shown in FIG. 7B, peak 706A of the corrected cepstrum 704A is now aligned with peak 706B of the corrected cepstrum 704B, which is expected if the actual lengths of the conduits 126 are the same.

In the illustrated implementation, both cepstrums 700A and 700B were scaled to the same length, remove the stretching effect caused by the unknown length of the conduit. If the two conduits 126 and their respective user interfaces 124 are being compared, scaling to the same assumed length can allow for an easier comparison. However, any cepstrum generated from acoustic data can generally be scaled to any desired length. For example, in some implementations, two conduits 126 that are assumed to have two different lengths may each be scaled to their respective assumed length, even if those lengths are different. In generally, a cepstrum can be scaled to its assumed length to remove any distortion caused by the actual length of the conduit 126. As discussed herein, this distortion can include the cepstrum being stretched, and the cepstrum being compressed. Thus, a cepstrum used to characterize and/or categorize a conduit 126 can be modified to account for the length of the conduit 126, so that the length of the conduit 126 does not distort the characterization and/or categorization of the user interface 124. Moreover, the scaling operation could also be applied to the acoustic data before generating the cepstrums. For example, the acoustic data can be used to generate a spectrum signal (which can show the intensity of reflections at various different frequencies, similar to the frequency-domain intensity signal 600). The scaling operation can be performed on the spectrum signal, which in turn can then be used to generate a cepstrum that accurately reflects the actual length of the conduit 126.

In additional or alternative implementations, an initial characterization and/or categorization of the user interface 124 can be adjusted based on features of the conduit 126 other than the length. For example, as discussed in more detail herein, the diameter of the conduit (and/or other features) can also be determined by analyzing acoustic data. The initial characterization and/or categorization of the conduit 126 can be adjusted based on the determined diameter of the conduit 126, and/or other determined features of the conduit 126. This adjustment can include calculating a cepstrum of the acoustic data, and then adjusting the cepstrum by multiplying the cepstrum by a ratio of (i) the determined diameter of the conduit to (ii) the assumed diameter of the conduit. Further, updating the characterization can include updating different types of acoustic data (other than cepstrums) based on the determined length and/or diameter of the conduit.

Figure 8:
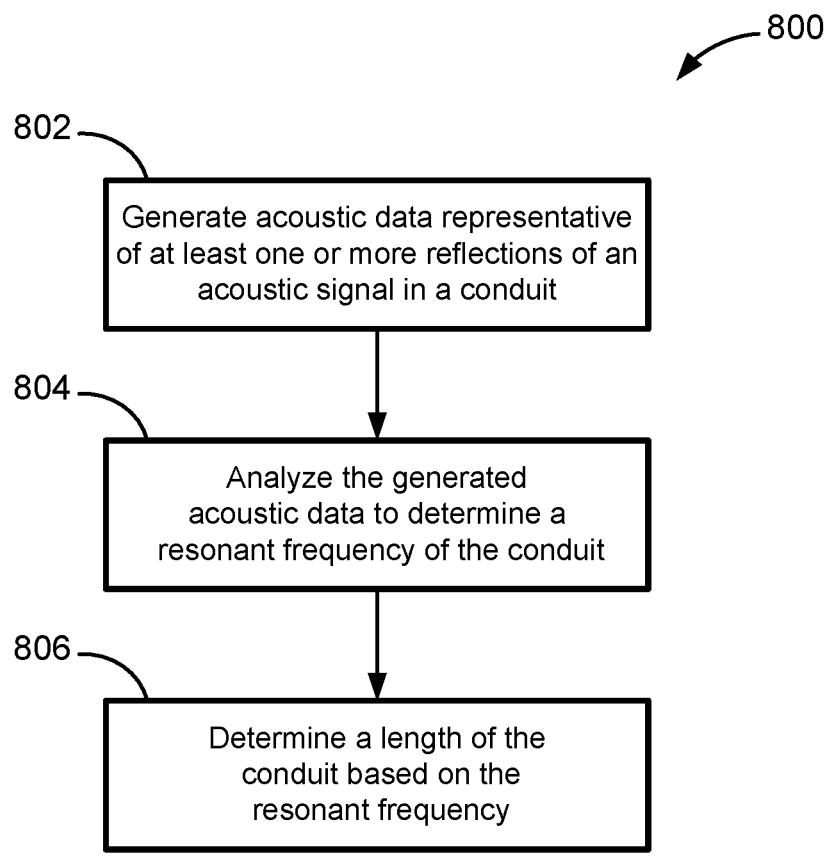
FIG. 8 is a flow diagram of a process for determining a length of a conduit, according to some implementations of the present disclosure.

FIG. 8 illustrates a method 800 for determining the length of a conduit that forms part of a respiratory therapy system. Generally, a control system having one or more processors (such as control system 110 of system 100) is configured to carry out the steps of method 800. A memory device (such as memory device 114 of system 100) can be used to store machine-readable instructions that are executed by the control system to carry out the steps of method 800. The memory device can also store any type of data utilized in the steps of method 800. In some cases, method 800 can be implemented using a system (such as system 100) that includes a respiratory therapy system (such as respiratory therapy system 120) having a respiratory therapy device configured to supply pressurized air (such as respiratory therapy device 122), a user interface (such as user interface 124) coupled to the respiratory therapy device via the conduit (such as conduit 126). The user interface is configured to engage with the user, and aids in directing the pressurized air to the user's airway.

Step 802 of method 800 includes generating acoustic data associated with a reflection of an acoustic signal. As discussed herein, a speaker (such as speaker 142) and/or other components (such as the motor of the respiratory therapy device 122) can emit an acoustic signal that can propagate within the respiratory therapy device 122, the user interface 124, the conduit 126, or any combination thereof. A microphone (such as microphone 140) can detect the reflections of the acoustic signal, and generate acoustic data that represents the reflections of the acoustic signal. In some implementations, the acoustic data represents a single reflection of the acoustic signal. In other implementations, the acoustic data represents a plurality of reflections of the acoustic signal.

In some implementations, the respiratory therapy system 120 is operated as the acoustic data is generated. In these implementations, the acoustic data can be generated while the respiratory therapy device 122 causes pressurized air to flow through the conduit 126. In other implementations, the respiratory therapy system 120 is not operated when the acoustic data is generated, such that the acoustic data is generated during an absence of the flow of the pressurized air through the conduit 126.

In some implementations, the acoustic signal is audible to humans. In other implementations, the acoustic signal is inaudible to humans. In these implementations, the acoustic signal may be inaudible due to the frequency of the acoustic signal being out of the audible frequency range of humans (e.g., less than about 20 Hz or greater than about 20 kHz). The acoustic signal may alternatively or additionally be inaudible due to the amplitude of the of the acoustic signal may too small for a human to hear.

Step 804 of method 800 includes analyzing the acoustic data to determine the resonant frequency of the conduit 126. In some implementations, step 804 includes generating a time-domain intensity signal from the acoustic data, and converting the time-domain intensity signal into a frequency-domain intensity signal (such as frequency-domain intensity signal 600). As discussed herein, the frequency-domain intensity signal represents the intensity of reflections of the acoustic signal within the conduit 126, across a frequency band. The frequency-domain intensity signal can be obtained by taking the Fourier Transform of the time-domain intensity signal, for example using a Fast Fourier Transform algorithm. In some implementations, the intensity is plotted on an absolute scale. In other implementations however, step 804 includes taking the log of the frequency-domain intensity signal, so that the intensity is plotted on an absolute scale.

Step 804 can further includes selecting a portion of the frequency-domain intensity signal that is expected to include the resonant frequency of the conduit 126. As discussed herein with respect to FIG. 6A, the frequency-domain intensity signal can include a variety of different peaks. Some of the peaks correspond to the resonant frequency of the conduit 126 and higher-order harmonics. However, other peaks can also be present due to portions of the acoustic signal propagating in the respiratory therapy device 122 and the user interface 124, additional noises other than the acoustic signal, general statistical noise in the acoustic data, and any additional confounding factors that may be present. By identifying and selecting the portion of the frequency-domain intensity signal expected to include the resonant frequency, the additional portions of the frequency-domain intensity signal are removed, which reduces the complexity present when analyzing the acoustic data.

The selection of the portion of the frequency-domain intensity signal that contains the resonant frequency can be based on a variety of factors. In some implementations, a predetermined estimate of the length and/or diameter of the conduit 126 is used to provide the frequency range within which the resonant frequency is expected to fall. For example, if it is known that the conduit 126 has a length that is generally between 1.5 meters and 2.0 meters and/or a diameter that is generally between 12 mm and 19 mm, those length and/or diameter estimates can be used to estimate the portion of the frequency-domain intensity signal where the resonant frequency is expected to be. Additionally or alternatively, the estimate can be based on the speed of sound within the conduit 126, the sampling rate of the of the acoustic data, known conditions both internal to the conduit 126 and external to the conduit 126 (such as the temperature or humidity, which can affect the speed of sound within the conduit 126), and other factors can be used by the skilled person in the art to estimate the portion of the frequency-domain intensity signal within which the resonant frequency exists.

In some implementations, a variety of different pre-processing steps can be applied to the portion of the frequency-domain intensity signal, or to the wave period intensity signal. In one implementation, the pre-processing includes de-trending, which can remove any fluctuations in the frequency-domain intensity signal unrelated to the length of the conduit 126. For example, the acoustic data may include artifacts (such as peaks, dips, etc.) due to physical characteristics of components other than the conduit 126, external noise and/or disturbances, data noise, etc. In additional or alternative implementations, the pre-processing includes spectral windowing. Spectral windowing can be used to improve the quality of the frequency-domain intensity signal, which is the Fourier Transform of the time-domain intensity signal. In some cases, the Fast Fourier Transform algorithm applied to the time-domain intensity signal can lead to various artifacts and other errors in the frequency-domain intensity signal. For example, if the endpoints of the time-domain intensity signal are discontinuous, the frequency-domain intensity signal may be slightly altered from the actual frequency-domain version of the time-domain intensity signal. Spectral windowing can be used to correct for the discontinuities in the endpoints of the time-domain intensity signal, so that the frequency-domain intensity signal more accurately represents the actual frequency spectrum of the reflections of the acoustic signal.

After the portion of the frequency-domain intensity signal that is expected to include the resonant frequency of the conduit is selected, the Fourier Transform of the selected portion of the frequency-domain intensity signal can be taken to generate a wave period intensity signal. The resonant frequency of the conduit 126 can then be determined from the wave period intensity signal. As discussed above in reference to FIG. 6B, the period of the standing wave that is propagating within the conduit 126 at the resonant frequency can be determined from the wave period intensity signal, so that the value of the resonant frequency is known. In other implementations, step 804 can include determining the resonant frequency from the initial time-domain intensity signal or the frequency-domain intensity signal.

Step 806 includes determining the length of the conduit 126 based at least in part on the resonant frequency of the conduit 126. The wavelength of the standing wave can be determined from the resonant frequency and the known speed of sound within the conduit 126. In turn, the length of the conduit is generally equal to one half of the wavelength of the standing wave propagating at the resonant frequency, as discussed herein. Thus, the length of the conduit 126 is generally proportional to the resonant frequency of the conduit 126.

In some implementations, method 800 can further include taking various actions based on the determined length of the conduit 126. In one implementation, the length of the conduit 126 can be determined, and then compared to the expected length of the conduit 126. If the actual length of the conduit 126 is different than the expected length, a specific action can be taken. For example, the length of the conduit 126 can affect the pressure of the pressurized air being delivered to the user's airway. If the conduit 126 is longer than expected, the pressure of the air once the air reaches the user interface 124 may be decreased to less than intended. Thus, the action can include increasing the pressure of the pressurized air. In contrast, the pressure of the pressurized air may be greater than intended if the conduit 126 is shorter than expected. Thus, the action can include decreasing the pressure of the pressurized air. The length of the conduit 126 can be measured before the user attaches the user interface 124 to their face, so that the pressure of the pressurized air can be set correctly when the user initially activates the respiratory therapy system 120. However, the length of the conduit 126 can also be measured at one or more points in time during the sleep session as the user is using the respiratory therapy system 120, and the pressure of the pressurized air can be dynamically adjusted during the sleep session. This implementation can be beneficial if the conduit 126 is flexible in length (either by design or as a result of excessive use and/or stretching over time), and the distance that the pressurized air must travel to reach the user can change.

The length of the conduit 126 being different than expected can also be an indication that the conduit 126 is worn and/or damaged. Thus, in some implementations, the action can include transmitting a notification to the user and/or to a third party. The third party can include the user's spouse, a family member, a friend, a healthcare provider, and others. The notification can indicate to the user and/or the third party that the length of the conduit 126 is different than expected. The notification could include a recommendation to replace the conduit 126, an estimate of how long the conduit 126 can still be used until the conduit 126 is too worn and/or damaged, and/or other information.

In some implementations, the determined length of the conduit 126 can be checked to see if the result is acceptable. If the determined length of the conduit 126 is not acceptable and/or outside of an expected bound (e.g., too long or too short), a different portion of the frequency-domain intensity signal can be selected so as to obtain an improved determination of the length of the conduit 126. For example, if the selected portion of the frequency-domain intensity signal results in a determined length that is too short (e.g., 15 centimeters) or too long (e.g., 10 meters), a different portion of the frequency-domain intensity signal can be selected to analyze. Additionally or alternatively, the same portion of the frequency-domain intensity signal can be re-analyzed to determine if a mistake or error occurred during the initial analysis.

In some implementations, the length of the conduit 126 can be periodically checked during the sleep session. In these implementations, the length of the conduit 126 can be determined at a first time before the respiratory therapy device 122 begins to supply pressurized air to the user's airway. Then, at a second time as the respiratory therapy device 122 is supplying pressurized air to the user's airway, the length of the conduit 126 can again be determined, to see if the conduit 126 has contracted or expanded during operation of the respiratory therapy device 122. If the length of the conduit 126 has changed by at least a threshold amount, an action can be performed. This action can include increasing or decreasing the pressure of the pressurized air supplied to the user's airway, adjusting other parameters of the pressurized air (such as humidity), transmitting a notification to the user and/or to a third party, etc. The length of the conduit 126 can continually be monitored over the duration of the sleep session as well.

In some implementations, method 800 can include generating an initial characterization and/or categorization of the user interface 124 that is coupled to the conduit 126. The acoustic data used to determine the length of the conduit 126 can be used to generate the initial characterization and/or categorization of the user interface 124, for example by calculating the cepstrum of the acoustic data. After the length of the conduit 126 is determined, an updated characterization and/or categorization of the user interface 124 can be generated based at least in part on the length of the conduit 126, as discussed herein with respect to FIGS. 7A and 7B. The updated characterization and/or categorization can be obtained by adjusting the cepstrum, for example by multiplying the cepstrum by the ratio of (i) the measured length of the conduit to (ii) the assumed length of the conduit 126. Updating the characterization and/or categorization of the user interface 124 can additionally or alternatively include adjusting other aspects of the acoustic data as well, based on the determined length of the conduit 126.

Any actions taken after determining the length of the conduit 126 based on the resonant frequency of the conduit 126 can also be taken after determining the length of the conduit 126 in a different manner. For example, in some implementations (and as described in further detail below), the length of the conduit can be determined without first determining the resonant frequency of the conduit 126. In these implementations, the same or similar actions (such as adjusting the pressure of the pressurized air, transmitting a notification to the user and/or a third party, verifying that the determined length is acceptable, checking the length of the conduit 126 during a sleep session to see if the length has changed during the sleep session, adjusting a characterization and/or categorization of the user interface 124, etc.) can be taken after determining the length of the conduit 126 without the use of the resonant frequency as are described herein with respect to method 800.

Generally, method 800 can be implemented using a system having a control system with one or more processors, and a memory device storing machine readable instructions. The control system can be coupled to the memory device, and method 800 can be implemented when the machine readable instructions are executed by at least one of the processors of the control system. Method 800 can also be implemented using a computer program product (such as a non-transitory computer readable medium) comprising instructions that when executed by a computer, cause the computer to carry out the steps of method 800.

Figure 9A:
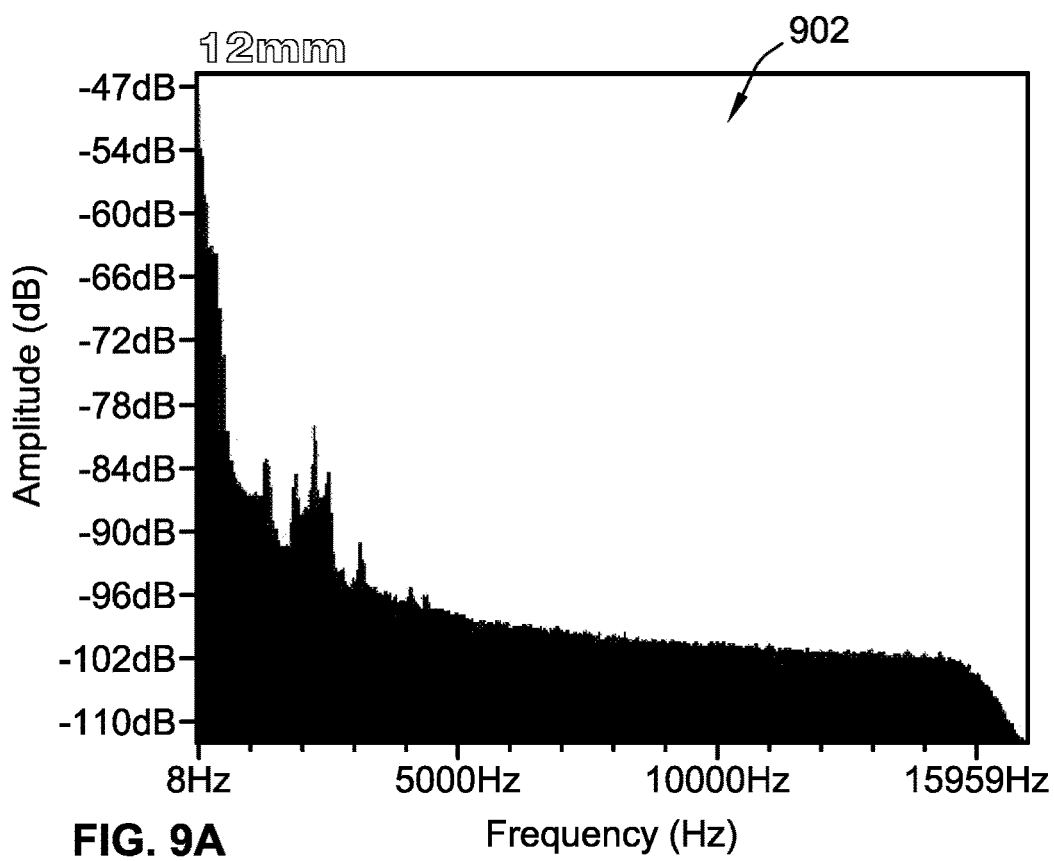
FIG. 9A illustrates a plot of a frequency-domain intensity signal generated with a conduit having a diameter of 12 mm.
Figure 9B:
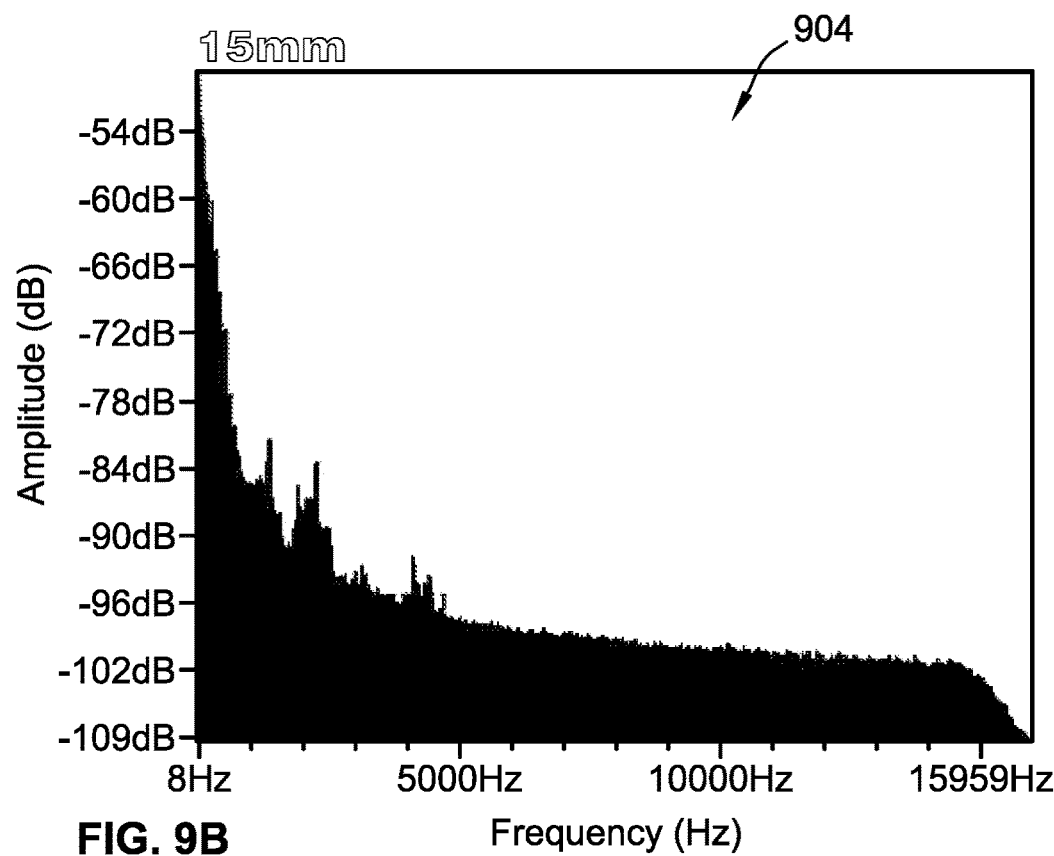
FIG. 9B illustrates a plot of a frequency-domain intensity signal generated with a conduit having a diameter of 15 mm.
Figure 9C:
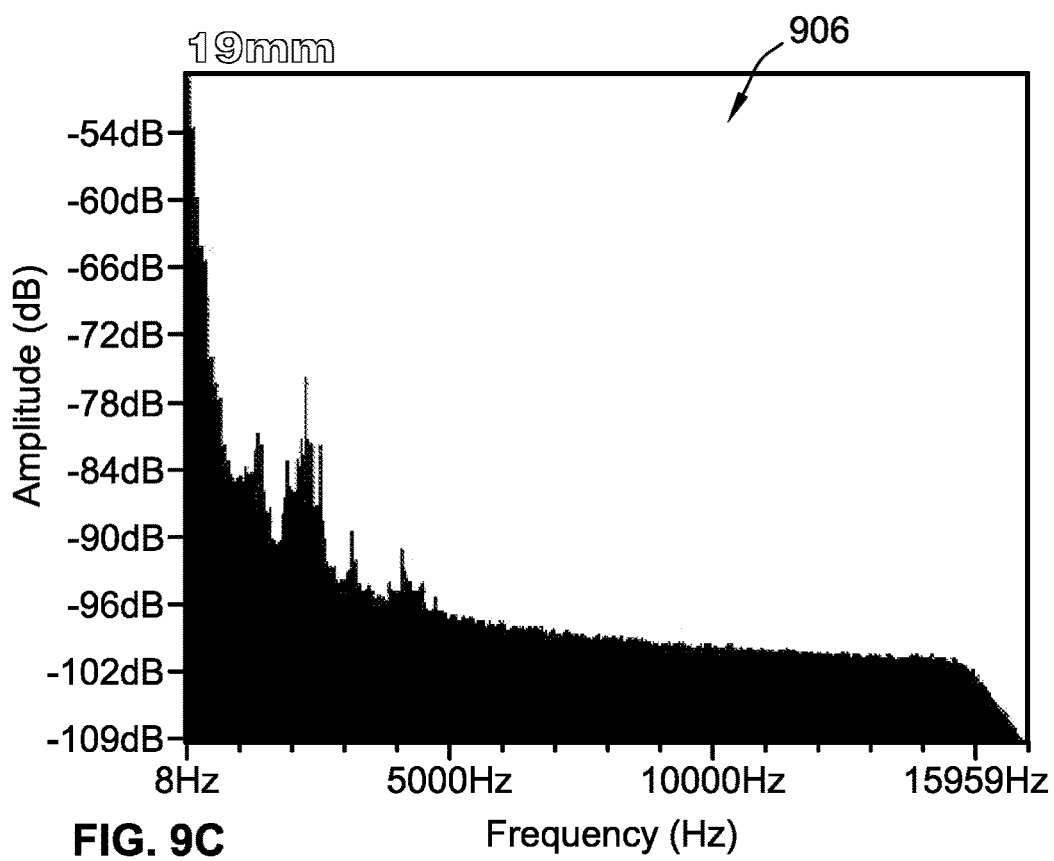
FIG. 9C illustrates a plot of a frequency-domain intensity signal generated with a conduit having a diameter of 19 mm.
Figure 9D:
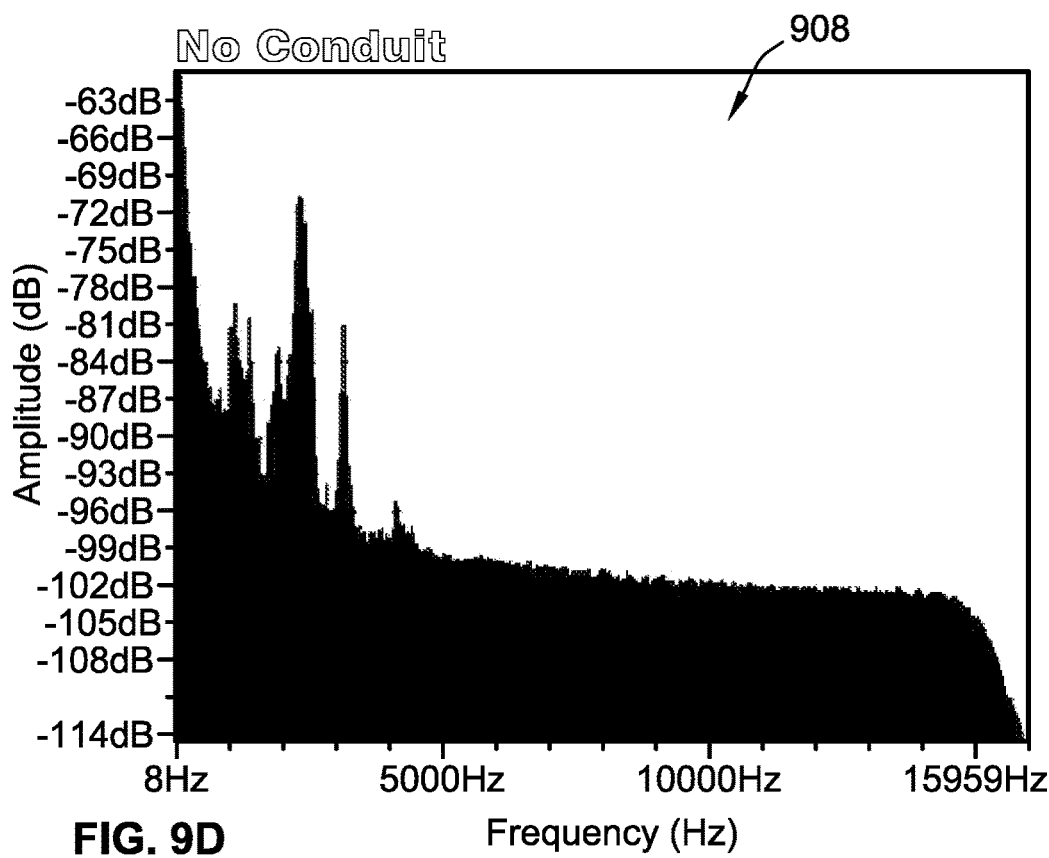
FIG. 9D illustrates a plot of a frequency-domain intensity signal generated with no conduit.

In some implementations, the diameter of the conduit (or other features of the conduit such as the length of the conduit), can be determined by receiving acoustic data generated using a conduit of unknown diameter, and comparing that acoustic data to other acoustic data generated using conduits of known diameters. FIGS. 9A-9C show frequency-domain intensity signals that were generated using conduits of different diameters. FIG. 9A shows a frequency-domain intensity signal 902 that was generated using a conduit with a diameter of 12 mm. FIG. 9B shows a frequency-domain intensity signal 904 that was generated using a conduit with a diameter of 15 mm. FIG. 9C shows a frequency-domain intensity signal 906 that was generated using a conduit with a diameter of 19 mm. FIG. 9D shows a frequency-domain intensity signal 908 that was generating using no conduit (e.g., a control). The frequency-domain intensity signals 902-908 can be generated using techniques that are the same as or similar to the techniques discussed herein with respect to FIGS. 5, 6A, and 6B.

As can be seen, each of the frequency-domain intensity signals 902-908 includes a variety of different features that are indicative of the diameter of the respective conduit, and can serve to distinguish the individual signals. These features can include a number of frequency peaks, the location of the frequency peaks (e.g., at what frequency each of the peaks occur), a spread of the frequency peaks (e.g., how wide or narrow the peaks are, or the frequency bandwidth of the peaks), the amplitude of the peaks, etc. One or more of these features can be understood to represent a "frequency response" in the acoustic data that is attributable to the diameter of the conduit in respect of which the acoustic data was generated. In some implementations, the frequency response can be understood to related to the shape of the curve of the frequency-domain intensity signal.

To determine the diameter (or other feature(s)) of an unknown conduit, a frequency-domain intensity signal representing the unknown conduit is generated, and can then be compared one or more predetermined frequency-domain intensity signals, such as the frequency-domain intensity signals 902A-902D illustrated in FIGS. 9A-9D. Each of these predetermined frequency-domain intensity signals can correspond to a conduit having a known diameter. Each of these known diameters is a potential diameter of the conduit being analyzed. For example, the conduits used to generate the signals in FIGS. 9A-9C could be conduits having diameters that are typically used with respiratory therapy systems in general, or the type of respiratory therapy system being used by the user. In another example, the conduits used to generate the signals used in the comparison could span a broad range of diameters (e.g., more diameters than just 12 mm, 15 mm, and 19 mm), to improve the likelihood that the diameter of the conduit being analyzed will generally match the diameter of one of the conduits being compared against. In general, the diameter of the conduit being analyzed will be the known diameter of one of the conduits being compared against, such that the known diameters of the conduits being compared against are all potential diameters of the conduit being analyzed.

The one of the predetermined frequency-domain intensity signals 902-908 that best matches the frequency-domain intensity signal of the unknown conduit can then be selected, such that the diameter of the conduit corresponding to the selected predetermined frequency-domain intensity signal is determined to be the diameter of the unknown conduit. Generally, comparing the frequency-domain intensity signals 902-908 includes comparing one or more features of the frequency-domain intensity signal (associated with the unknown conduit) to one or more features of each of the predetermined frequency-domain intensity signals 902-908. The predetermined frequency-domain intensity signal with features that best match the features of the frequency-domain intensity signal of the unknown conduit can then be selected. The comparison of the features could be done manually (e.g., by a human, by the user, by a healthcare practitioner, etc.), or could be done using a computer.

In some implementations, a trained model can be used to determine the diameter of the unknown conduit. In these implementations, a model (such as a convolutional neural network), is trained using frequency-domain intensity signals (or features extracted from those frequency-domain intensity signals) that represent conduits of known diameters (e.g., frequency-domain intensity signals that each correspond to a potential diameter of the conduit being analyzed). The model can be trained or otherwise used to identify features in the frequency-domain intensity signals, and then correlate the identified features to the diameter of the conduit. Then, a frequency-domain intensity signal representing a conduit with an unknown diameter can be input into the trained model. The trained model identifies features in this frequency-domain intensity signal, and determines the diameter of the conduit based on these features.

While FIGS. 9A-9D show frequency-domain intensity signals used to determine the diameter of the conduit, other types of signals can be used as well. For example, in some implementations, a cepstrum can be used. In these implementations, a cepstrum is generated from the acoustic data. In one example, a cepstrum is generated by first calculating the logarithm of the different frequency bins in the frequency-domain intensity signals of any of FIGS. 9A-9D, and then performing an inverse Fourier transform. The cepstrum can include one or more features indicative of the diameter of the conduit, including a number of quefrency peaks, the location of the quefrency peaks (e.g., at what quefrency each of the peaks occur), a spread of the quefrency peaks (e.g., how wide or narrow the peaks are, or the quefrency bandwidth of the peaks), the amplitude of the peaks, etc. The generated cepstrum (corresponding to a conduit of an unknown diameter) can then be compared to predetermined cepstrums that each correspond to a conduit of a known diameter (e.g., each predetermined cepstrum corresponds to a potential diameter of the conduit being analyzed). The predetermined cepstrum that best matches the generated cepstrum can be selected. In some cases, similar to the frequency-domain intensity signals, one or more features of the generated cepstrum can be compared to one or more features of each of the predetermined cepstrums, and the predetermined cepstrum with features that best match the features of the generated cepstrum can then be selected, such that the diameter of the unknown conduit is determined to be the diameter of the conduit corresponding to the selected cepstrum. The comparison of the features can be done manually (e.g., by a human, by the user, by a healthcare practitioner, etc.), or can be done using a computer.

Similar to the frequency-domain intensity signals, a trained model can also be used to determine the diameter of the conduit using cepstrums. In these implementations, the model (such as a convolutional neural network) is trained using the predetermined cepstrums that correspond to conduits of known diameters (e.g., predetermined cepstrums that each correspond to a potential diameter of the conduit being analyzed). The model can be trained or otherwise used to identify features in the cepstrums, and correlate the identified features to the diameter of the conduit. A cepstrum representing a conduit with an unknown diameter can be input into the trained model. The trained model then identifies features in this cepstrum, and determines the diameter of the conduit.

In still further implementations, other types of acoustic data can be used in a similar manner to determine the diameter of the conduit. For example, a time-domain intensity signal (e.g., a plot of the amplitude of an acoustic wave or reflection) can be obtained for a conduit having an unknown diameter, and then compared to predetermined time-domain intensity signals corresponding to conduits of known diameters (e.g., time-domain intensity signals that each correspond to a potential diameter of the conduit being analyzed), in order to determine the diameter of the conduit. In another example, a wave period intensity signal (which could be similar to the wave period intensity signal 620 in FIG. 6B) can be obtained for a conduit having an unknown diameter, and then compared to predetermined wave period intensity signals corresponding to conduits of known diameters (e.g., wave period intensity signals that each correspond to a potential diameter of the conduit being analyzed), in order to determine the diameter of the conduit. Generally, any type of acoustic data can be used to determine the diameter of the conduit. Acoustic data generated from a conduit of an unknown diameter can be compared to one or more predetermined sets of acoustic data corresponding to conduits of known diameters (e.g., by comparing features) to determine the diameter of the conduit. Each predetermined set of acoustic data corresponds to a potential diameter of the conduit being analyzed. Alternatively, a model (such as a convolutional neural network) can be trained using one or more predetermined sets of acoustic data, and the acoustic data corresponding to the conduit of an unknown diameter can be input into the trained model to determine the diameter of the conduit.

In further implementations, other features or characteristics of the conduit can be determined using these techniques. For example, the length of the conduit can be determined by comparing acoustic data (e.g., a time-domain intensity signal, a frequency-domain intensity signal, a cepstrum, a wave period intensity signal, etc.) from a conduit of unknown length to one or more predetermined sets of acoustic data (which may include one or more predetermined time-domain intensity signals, one or more predetermined frequency-domain intensity signals, one or more predetermined cepstrums, one or more predetermined wave period intensity signals, etc.). Each predetermined set of acoustic data corresponds to a potential length of the conduit being analyzed. Features in the acoustic data can be compared to determine the length of the conduit. In another example, a model (such as a convolutional neural network) can be trained using the predetermined sets of acoustic data, and the acoustic data corresponding to the conduit of unknown length can be input into the trained model, which then determines the length of the conduit.

The determined diameter of the conduit can be used in many of the same ways as the determined length of the conduit. For example, method 800 can include taking various actions based on the determined diameter of the conduit 126. If the determined diameter of the conduit 126 is different than the expected diameter of the conduit 126, a specific action may be taken. This action can include increasing the pressure of the pressurized air (if the diameter is larger than expected) or decreasing the pressure of the pressurized air (if the diameter is smaller than expected). In some cases, the diameter of the conduit 126 can be measured before the user attaches the user interface 124 to their face, so that the pressure of the pressurized air can be set correctly when the user initially activates the respiratory therapy system 120. However, the diameter of the conduit 126 can also be measured at one or more points in time during the sleep session as the user is using the respiratory therapy system 120, and the pressure of the pressurized air can be dynamically adjusted during the sleep session. This implementation can be beneficial if the conduit 126 is flexible diameter (either by design or as a result of excessive use and/or stretching over time), and the volume that the pressurized air must travel through to reach the user can change.

In some implementations, the determined diameter of the conduit 126 can be checked to see if the result is acceptable. If the determined diameter of the conduit 126 is not acceptable, a different portion of the acoustic data can be selected so as to obtain an improved determination of the diameter of the conduit 126. For example, if the selected portion of the acoustic data results in a determined diameter that is too large or too small, a different portion of the acoustic data can be selected to analyze. Additionally or alternatively, the same portion of the acoustic data can be re-analyzed to determine if a mistake or error occurred during the initial analysis.

In some implementations, the diameter of the conduit 126 can be periodically checked during the sleep session. In these implementations, the diameter of the conduit 126 can be determined at a first time before the respiratory therapy device 122 begins to supply pressurized air to the user's airway. Then, at a second time as the respiratory therapy device 122 is supplying pressurized air to the user's airway, the diameter of the conduit 126 can again be determined, to see if the diameter of conduit 126 has increased or decreased during operation of the respiratory therapy device 122. If the diameter of the conduit 126 has changed by at least a threshold amount, an action can be performed. This action can include increasing or decreasing the pressure of the pressurized air supplied to the user's airway, adjusting other parameters of the pressurized air (such as humidity), transmitting a notification to the user and/or to a third party, etc. The diameter of the conduit 126 can continually be monitored over the duration of the sleep session as well.

In some implementations, the characterization and/or categorization that can be generated as part of method 800 can be updated based at least in part on the diameter of the conduit 126. The updated characterization and/or categorization can be obtained by adjusting the cepstrum, for example by multiplying the cepstrum by the ratio of (i) the measured diameter of the conduit 126 to (ii) the assumed diameter of the conduit 126. Updating the characterization and/or categorization of the user interface 124 can additionally or alternatively include adjusting other aspects of the acoustic data as well, based on the determined diameter of the conduit 126.

Figure 10:
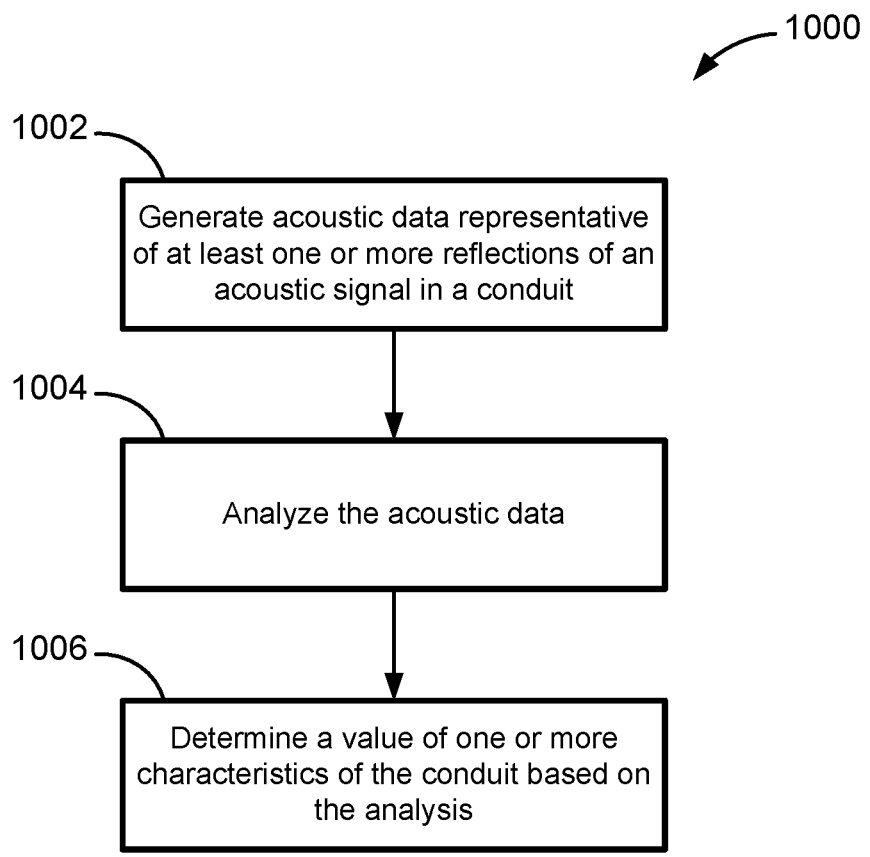
FIG. 10 is a flow diagram of a process for determining a value of a characteristic of a conduit, according to some implementations of the present disclosure.

FIG. 10 illustrates a method 1000 for determining a value of one or more characteristics of a conduit that forms part of a respiratory therapy system. Generally, a control system having one or more processors (such as control system 110 of system 100) is configured to carry out the steps of method 1000. A memory device (such as memory device 114 of system 100) can be used to store machine-readable instructions that are executed by the control system to carry out the steps of method 1000. The memory device can also store any type of data utilized in the steps of method 1000. In some cases, method 1000 can be implemented using a system (such as system 100) that includes a respiratory therapy system (such as respiratory therapy system 120) having a respiratory therapy device configured to supply pressurized air (such as respiratory therapy device 122), a user interface (such as user interface 124) coupled to the respiratory therapy device via the conduit (such as conduit 126). The user interface is configured to engage with the user, and aids in directing the pressurized air to the user's airway.

Step 1002 of method 1000 includes generating acoustic data that is representative of at least one or more reflections of an acoustic signal. These reflections can be indicative of a value of one or more characteristics of the conduit (such as length and/or diameter). The acoustic data can be generated using any suitable techniques or methods as disclosed herein.

Step 1004 of method 1000 analyzing the generated acoustic data. In some cases, analyzed the generated acoustic data includes comparing the generated acoustic data to one or more predetermined sets of acoustic data. Each predetermined set of acoustic data corresponds to a known value of at least one of the one or more characteristics (e.g., a known length of a conduit, a known diameter of a conduit, etc.). Thus, each predetermined set of acoustic data corresponds to a potential value of at least one of the one or more characteristics. The analyzing can include any of the techniques disclosed herein, including comparing features in the acoustic data to features in predetermined sets of acoustic data, inputting the acoustic data into a trained model, etc. Step 1006 includes determining a value of the one or more characteristics of the conduit (e.g., the length and/or diameter of the conduit) based on the analysis. The determining can include any of the techniques disclosed herein, including selecting the predetermined set of acoustic data that best matches the generated acoustic data.

In some implementations, analyzing the acoustic data at step 1004 includes determining the resonant frequency of the conduit. The resonant frequency of the conduit can be determined using any suitable techniques, including those discussed herein with respect to FIGS. 6A, 6B, and 8. In these implementations, determining a value of the one or more characteristics of the conduit at step 1006 includes determining the length of the conduit based at least in part on the resonant frequency of the conduit. The length of the conduit can be determined from the resonant frequency using any suitable techniques, including those discussed herein with respect to FIGS. 6A, 6B, and 8.

In some cases, method 1000 can include taking a variety of different actions after determining the value of the one or more characteristics of the conduit. These actions can include adjusting the pressure of the pressurized air (for example if the determined value of the characteristic(s) impacts the pressure of the pressurized air at the user interface), transmitting a notification to the user and/or a third party (for example if the determined value of the characteristic(s) indicates that the conduit is need of replacement or repair), verifying that the determined value of the one or more characteristic(s) is acceptable (for example if the determined value of the characteristic(s) is outside of an expected bound), checking the characteristic of the conduit during a sleep session to see if the value of the characteristic has changed during the sleep session, adjusting a characterization and/or categorization of the user interface, etc.

Generally, method 1000 can be implemented using a system having a control system with one or more processors, and a memory device storing machine readable instructions. The control system can be coupled to the memory device, and method 1000 can be implemented when the machine readable instructions are executed by at least one of the processors of the control system. Method 1000 can also be implemented using a computer program product (such as a non-transitory computer readable medium) comprising instructions that when executed by a computer, cause the computer to carry out the steps of method 1000.

One or more elements or aspects or steps, or any portion(s) thereof, from one or more of any of the claims can be combined with one or more elements or aspects or steps, or any portion(s) thereof, from one or more of any of the other claims or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations or alternative implementations according to aspects of the present disclosure may combine any number of features from any of the implementations described herein, such as, for example, in the alternative implementations described below.

What is claimed is:

1. A method comprising:
generating acoustic data representative of at least one or more reflections of an acoustic signal in a conduit coupled to a respiratory therapy device, the one or more reflections being indicative of a length of the conduit, a diameter of the conduit, or both the length and the diameter of the conduit; and
analyzing the acoustic data to determine the length of the conduit, the diameter of the conduit, or both the length of the conduit and the diameter of the conduit, the analyzing including:
producing a frequency intensity signal from the acoustic data, the frequency intensity signal representing an intensity of the one or more reflections of the acoustic signal across a frequency band;
selecting a portion of the frequency intensity signal expected to include the resonant frequency of the conduit;
calculating a transform of the selected portion of the frequency intensity signal to generate a wave period intensity signal;
extracting a resonant frequency of the conduit from the wave period intensity signal; and
determining the length of the conduit based at least in part on the resonant frequency of the conduit.

2. The method of claim 1, wherein analyzing the acoustic data to determine the length of the conduit, the diameter of the conduit, or both the length of the conduit and the diameter of the conduit includes:
comparing at least a portion of the acoustic data to one or more predetermined sets of acoustic data, each of the one or more predetermined sets of acoustic data corresponding to (i) a conduit having a known length, (ii) a conduit having a known diameter, or (iii) both (i) and (ii); and
selecting one of the one or more predetermined sets of acoustic data that matches the portion of the acoustic data, the selected predetermined set of acoustic data corresponding to the length of the conduit, the diameter of the conduit, or both the length of the conduit and the diameter of the conduit.

3. The method of claim 1, wherein analyzing the acoustic data to determine the length of the conduit, the diameter of the conduit, or both the length of the conduit and the diameter of the conduit includes:
comparing the frequency-domain intensity signal to one or more predetermined frequency intensity signals, each of the one or more predetermined frequency intensity signals corresponding to (i) a conduit having a known length, (ii) a conduit having a known diameter, or (iii) both (i) and (ii); and
selecting one of the one or more predetermined frequency signals that matches the frequency intensity signal, the selected predetermined frequency intensity signal corresponding to the length of the conduit, the diameter of the conduit, or both the length of the conduit and the diameter of the conduit.

4. The method of claim 1, wherein analyzing the acoustic data to determine the length of the conduit, the diameter of the conduit, or both the length of the conduit and the diameter of the conduit includes:
generating a cepstrum from the acoustic data;
comparing the generated cepstrum to one or more predetermined cepstrums, each of the one or more predetermined cepstrums corresponding to (i) a conduit having a known length, (ii) a conduit having a known diameter, or (iii) both (i) and (ii); and
selecting one of the one or more predetermined cepstrums that matches the generated cepstrum, the selected predetermined cepstrum corresponding to the length of the conduit, the diameter of the conduit, or both the length of the conduit and the diameter of the conduit.

5. The method of claim 1, wherein analyzing the acoustic data further includes:
calculating a log of the frequency intensity signal prior to the selecting the portion of the frequency intensity signal that is expected to include the resonant frequency of the conduit;
performing pre-processing on the acoustic data prior to determining the resonant frequency, the pre-processing including (i) de-trending, (ii) spectral windowing, or (iii) both (i) and (ii).

6. The method of claim 1, wherein selecting the portion of the frequency intensity signal expected to include the resonant frequency of the conduit is based at least in part on a speed of sound, a sampling rate of the acoustic data, predetermined conduit length ranges, predetermined conduit diameter ranges, or any combination thereof.

7. The method of claim 1, wherein the length of the conduit is proportional to the resonant frequency of the conduit.

8. The method of claim 1, further comprising:
generating an initial characterization of a user interface coupled to the conduit, an initial categorization of the user interface, or both, based at least in part on the acoustic data; and
generating an updated characterization of the user interface, an updated categorization of the user interface, or both, based at least in part on (i) the initial characterization of the user interface, the initial categorization of the user interface, or both, and (ii) the length of the conduit, the diameter of the conduit, or both the length of the conduit and the diameter of the conduit.

9. The method of claim 8, wherein generating the initial characterization of the user interface, the initial categorization of the user interface, or both, includes calculating a cepstrum of the generated acoustic data.

10. The method of claim 9, wherein generating the updated characterization of the user interface, the updated categorization of the user interface, or both, includes adjusting the cepstrum based at least in part on the length of the conduit, the diameter of the conduit, or both the length of the conduit and the diameter of the conduit.

11. The method of claim 10, wherein the initial characterization of the user interface, the initial categorization of the user interface, or both, is based at least in part on an assumed length of the conduit, and wherein adjusting the cepstrum includes multiplying the cepstrum by a ratio of (i) the determined length of the conduit to (ii) the assumed length of the conduit.

12. The method of claim 10, wherein the initial characterization of the user interface, the initial categorization of the user interface, or both, is based at least in part on an assumed diameter of the conduit, and wherein adjusting the cepstrum includes multiplying the cepstrum by a ratio of (i) the determined diameter of the conduit to (ii) the assumed diameter of the conduit.

13. The method of claim 8, wherein the initial characterization of the user interface includes a determination of a type of the user interface, a determination of a manufacturer of the user interface, a determination of a model of the user interface, a determination of a form factor of the user interface, a determination of a size of one or more elements of the user interface, or any combination thereof.

14. The method of claim 8, wherein the initial categorization of the user interface includes a determination of whether the user interface belongs to a first user interface category or a second user interface category,
  wherein (i) the first user interface category is associated with a direct connection between the conduit and a cushion of the user interface, between the conduit and a frame of the user interface, or between the conduit and both the cushion and the frame, and
  wherein the second user interface category is associated with an indirect connection between the conduit and a cushion of the user interface, between the conduit and a frame of the user interface, or between the conduit and both the cushion and the frame.

15. The method of claim 1, further comprising:
  supplying pressurized air to an airway of a user via the conduit and a user interface coupled to the conduit;
  comparing (i) the length of the conduit to an expected length of the conduit, (ii) the diameter of the conduit to an expected diameter of the conduit, or (iii) both (i) and (ii); and
  in response to (i) the length of the conduit being different than the expected length of the conduit, (ii) the diameter of the conduit being different than the determined length of the conduit, or (iii) both (i) and (ii), increasing or decreasing a pressure of the pressurized air supplied to the airway of the user.

16. The method of claim 15, wherein in response to the length of the conduit being greater than the expected length of the conduit or the diameter of the conduit being greater than the expected diameter of the conduit, the action includes increasing the pressure of the pressurized air, and wherein in response to the length of the conduit being less than the expected length of the conduit or the diameter of the conduit being less than the expected diameter of the conduit, the action includes decreasing the pressure of the pressurized air.

17. The method of claim 1, further comprising:
  supplying pressurized air to an airway of a user via the conduit and a user interface coupled to the conduit;
  determining (i) the length of the conduit at a first time prior to the supplying of the pressurized air to the airway of the user, (ii) the diameter of the conduit at the first time, or (iii) both (i) and (ii);
  determining the length of the conduit at a second time during the supplying of the pressurized air to the airway of the user, (ii) the diameter of the conduit at the second time, or (iii) both (i) and (ii); and
  in response to (i) the length of the conduit at the second time being different than the length of the conduit at the first time by at least a threshold amount, (ii) the diameter of the conduit at the second time being different than the diameter of the conduit at the first time by at least a threshold amount, or (iii) both (i) and (ii), increasing or decreasing a pressure of the pressurized air supplied to the airway of the user.

18. The method of claim 1, wherein the transform includes a Fourier Transform, an inverse Fourier Transform, a cross-correlation analysis, or any combination thereof.

19. A system comprising:
  a respiratory therapy system including:
    a respiratory therapy device configured to supply pressurized air; and
    a user interface coupled to the respiratory therapy device via a conduit, the user interface being configured to engage the user and aid in directing the supplied pressurized air to an airway of the user;
  a memory device storing machine-readable instructions; and
  a control system coupled to the memory device, the control system including one or more processors configured to execute the machine-readable instructions to:
    generate acoustic data representative of at least one or more reflections of an acoustic signal in the conduit, the one or more reflections being indicative of a length of the conduit, a diameter of the conduit, or both the length of the conduit and the diameter of the conduit; and
    analyze the acoustic data to determine the length of the conduit, the diameter of the conduit, or both the length of the conduit and the diameter of the conduit, wherein to analyze the acoustic data, the one or more processors of the control system are configured to execute the machine-readable instructions to:
      produce a frequency intensity signal from the acoustic data, the frequency intensity signal representing an intensity of the one or more reflections of the acoustic signal across a frequency band;
      select a portion of the frequency intensity signal expected to include the resonant frequency of the conduit;
      calculate a transform of the selected portion of the frequency intensity signal to generate a wave period intensity signal;
      extract a resonant frequency of the conduit from the wave period intensity signal; and
      determine the length of the conduit based at least in part on the resonant frequency of the conduit.

20. The system of claim 19, wherein the transform includes a Fourier Transform, an inverse Fourier Transform, a cross-correlation analysis, or any combination thereof.

* * * * *